United States Patent
Briant et al.

(10) Patent No.: US 11,297,842 B2
(45) Date of Patent: Apr. 12, 2022

(54) BAKED SAVORY FOOD COMPOSITION COMPRISING SHREDDED ROOT VEGETABLE AND METHOD OF MAKING THE SAME

(71) Applicant: Mondelez Europe GmbH, Glattpark (CH)

(72) Inventors: Karine Coue Briant, East Hanover, NJ (US); Omar Crewe, East Hanover, NJ (US); Fidelma Crowe, East Hanover, NJ (US); Frederik Jensen, Cambridge, MA (US); Sharat Jonnalagadda, Cambridge, MA (US); Abby S. Kendall, East Hanover, NJ (US); Joseph Lavin, East Hanover, NJ (US); Adam Melonas, Cambridge, MA (US); Janelle Myers, Cambridge, MA (US); Tom Nosek, East Hanover, NJ (US); Lena Marisa Sawin, Cambridge, MA (US); JulLea Stolsky, East Hanover, NJ (US); Vani Vemulapalli, East Hanover, NJ (US)

(73) Assignee: MONDELEZ EUROPE GMBH, Glattpark (CH)

( * ) Notice: Subject to any disclaimer, the term of this patent is extended or adjusted under 35 U.S.C. 154(b) by 353 days.

(21) Appl. No.: 16/305,036

(22) PCT Filed: Jun. 5, 2017

(86) PCT No.: PCT/IB2017/000787
§ 371 (c)(1),
(2) Date: Nov. 27, 2018

(87) PCT Pub. No.: WO2017/212335
PCT Pub. Date: Dec. 14, 2017

(65) Prior Publication Data
US 2020/0315187 A1  Oct. 8, 2020

Related U.S. Application Data

(60) Provisional application No. 62/345,851, filed on Jun. 5, 2016, provisional application No. 62/355,254, filed on Jun. 27, 2016.

(51) Int. Cl.
| | | |
|---|---|---|
| A21D 2/36 | (2006.01) | |
| A23L 19/00 | (2016.01) | |
| A23L 7/126 | (2016.01) | |
| A23L 19/10 | (2016.01) | |
| A21D 2/16 | (2006.01) | |
| A21D 2/18 | (2006.01) | |

(52) U.S. Cl.
CPC ............ *A21D 2/366* (2013.01); *A21D 2/165* (2013.01); *A21D 2/181* (2013.01); *A21D 2/364* (2013.01); *A23L 7/126* (2016.08); *A23L 19/05* (2016.08); *A23L 19/10* (2016.08); *A23V 2002/00* (2013.01)

(58) Field of Classification Search
USPC ......................................................... 426/285
See application file for complete search history.

(56) References Cited

U.S. PATENT DOCUMENTS

| | | |
|---|---|---|
| 2,011,050 A | 8/1935 | Greenwood |
| 3,925,567 A | 12/1975 | Abe |
| 3,956,517 A | 5/1976 | Curry |
| 4,038,427 A | 7/1977 | Martin |
| 4,246,293 A | 1/1981 | Larson |
| 4,327,116 A | 4/1982 | Weith |
| 4,419,375 A | 12/1983 | Willard |
| 4,584,203 A | 4/1986 | Du Vall |
| 4,595,596 A | 6/1986 | Fazzolare |
| 4,623,548 A | 11/1986 | Willard |
| 4,761,296 A | 8/1988 | Fazzolare |
| 4,777,045 A | 10/1988 | Vanderveer |
| 4,778,690 A | 10/1988 | Sadel, Jr. |
| 4,810,660 A | 3/1989 | Willard |
| 4,844,919 A | 7/1989 | Szwerc |
| 4,871,557 A | 10/1989 | Linscott |
| 4,925,693 A | 5/1990 | Lauly |
| 4,938,982 A | 7/1990 | Howard |
| 4,970,084 A | 11/1990 | Pirrotta |
| 5,102,679 A | 4/1992 | Whalen |
| 5,132,127 A | 7/1992 | Wisdom |

(Continued)

FOREIGN PATENT DOCUMENTS

| | | |
|---|---|---|
| CA | 1184424 | 3/1985 |
| CA | 2442249 | 4/2004 |

(Continued)

OTHER PUBLICATIONS

International Search Report and Written Opinion, International Patent Application No. PCT/IB2018/000653, dated Sep. 27, 2018 (9 pgs.).

(Continued)

*Primary Examiner* — Jyoti Chawla
(74) *Attorney, Agent, or Firm* — Fitch, Even, Tabin & Flannery LLP

(57) ABSTRACT

A baked food composition is provided that exhibits an unexpectedly loose, crunchy texture and multi-textural chew. The baked composition comprises a high amount of expanded inclusions and shredded root vegetable, which are agglomerated by a binder component comprising low amounts of oil, added sugar, and flour. The food composition is preferably free of hydrocolloid gums and sugar syrups.

13 Claims, 12 Drawing Sheets

(56) References Cited

U.S. PATENT DOCUMENTS

| | | |
|---|---|---|
| 5,244,689 A | 9/1993 | Slimak |
| 5,258,196 A | 11/1993 | Lohan |
| 5,264,238 A | 11/1993 | Taga |
| 5,275,830 A | 1/1994 | Smith |
| 5,374,440 A | 12/1994 | Chedid |
| 5,413,805 A | 5/1995 | Delpierre, III |
| 5,498,438 A | 3/1996 | Strong |
| 5,612,074 A | 3/1997 | Leach |
| 5,660,253 A | 8/1997 | Rike |
| 5,695,804 A | 12/1997 | Hnat |
| 5,789,012 A | 8/1998 | Slimak |
| 5,871,801 A | 2/1999 | Kazemzadeh |
| 5,891,493 A | 4/1999 | Santillo, Jr. |
| 6,010,732 A | 1/2000 | Van Lengerich |
| 6,139,884 A | 10/2000 | Shifferaw |
| 6,177,116 B1 | 1/2001 | Villagran |
| 6,303,163 B1 | 10/2001 | Wu |
| 6,352,738 B1 | 3/2002 | Carels |
| 6,368,650 B1 | 4/2002 | Pizzey |
| 6,419,972 B1 | 7/2002 | Akimoto |
| 6,432,465 B1 | 8/2002 | Martines-Serna Villagran |
| 6,555,153 B1 | 4/2003 | Keller |
| 6,569,481 B1 | 5/2003 | Malfait |
| 6,586,031 B1 | 7/2003 | Kelly |
| 6,607,767 B1 | 8/2003 | Malfait |
| 6,632,465 B1 | 10/2003 | Malfait |
| 6,676,983 B2 | 1/2004 | Malfait |
| 6,713,100 B1 | 3/2004 | Schmoutz |
| 6,713,102 B2 | 3/2004 | Conti |
| 6,723,357 B1 | 4/2004 | Shifferaw |
| 6,800,310 B2 | 10/2004 | Squire |
| 6,821,537 B2 | 11/2004 | Wu |
| 6,827,965 B1 | 12/2004 | Fitzpatrick |
| 6,899,909 B2 | 5/2005 | Malfait |
| 6,929,813 B2 | 8/2005 | Malfait |
| 7,037,551 B2 | 5/2006 | Moore |
| 7,048,960 B2 | 5/2006 | Pizzey |
| 7,094,317 B2 | 8/2006 | Lundberg |
| 7,135,201 B2 | 11/2006 | Malfait |
| 7,141,257 B2 | 11/2006 | Malfait |
| 7,169,422 B2 | 1/2007 | Mesu |
| 7,172,771 B2 | 2/2007 | Ryu |
| 7,189,424 B2 | 3/2007 | Gorski |
| 7,235,276 B2 | 6/2007 | Allen |
| 7,244,457 B2 | 7/2007 | Racicot |
| 7,264,841 B2 | 9/2007 | Lester |
| 7,297,357 B2 | 11/2007 | Akimoto |
| 7,396,555 B2 | 7/2008 | Baumgartner |
| 7,413,760 B2 | 8/2008 | Green |
| 7,416,755 B2 | 8/2008 | Gorski |
| 7,442,396 B2 | 10/2008 | Casper |
| 7,462,371 B2 | 12/2008 | Kanya |
| 7,507,431 B2 | 3/2009 | Faa |
| 7,655,268 B2 | 2/2010 | Appelqvist |
| 7,820,223 B2 | 10/2010 | Bhaskar |
| 7,829,128 B2 | 11/2010 | Karwowski |
| 7,887,863 B2 | 2/2011 | Graham |
| 7,892,589 B2 | 2/2011 | Casper |
| 7,897,191 B2 | 3/2011 | Kelly |
| 7,947,320 B2 | 5/2011 | Faa |
| 7,985,438 B2 | 7/2011 | Mizrahi |
| 8,080,273 B2 | 12/2011 | Lykomitros |
| 8,119,179 B2 | 2/2012 | Parsons |
| 8,119,181 B2 | 2/2012 | Anand |
| 8,124,146 B2 | 2/2012 | Salminen |
| 8,277,865 B2 | 10/2012 | Bunke |
| 8,361,528 B2 | 1/2013 | Schopf |
| 8,361,532 B2 | 1/2013 | David |
| 8,367,139 B2 | 2/2013 | Haynes |
| 8,372,466 B2 | 2/2013 | Mingus |
| 8,425,966 B2 | 4/2013 | Casper |
| 8,486,475 B2 | 7/2013 | Villagran |
| 8,541,044 B1 | 9/2013 | Johnson |
| 8,652,544 B2 | 2/2014 | Minatelli |
| 8,715,760 B2 | 5/2014 | Ashourian |
| 8,778,442 B2 | 7/2014 | Khan |
| 8,790,736 B2 | 7/2014 | Smith |
| 8,815,319 B2 | 8/2014 | Zapp Glauser |
| 8,877,277 B2 | 11/2014 | Ganjyal |
| 8,916,224 B2 | 12/2014 | Karwowski |
| 9,034,411 B2 | 5/2015 | Johnson |
| 9,131,726 B2 | 9/2015 | Minatelli |
| 9,428,760 B2 | 8/2016 | Frohberg |
| 9,532,964 B2 | 1/2017 | Dudai |
| 9,556,446 B2 | 1/2017 | McCouch |
| 9,629,790 B2 | 4/2017 | Lundberg |
| 2003/0091697 A1* | 5/2003 | Froseth .................. A23L 7/126 426/93 |
| 2004/0219280 A1 | 11/2004 | Green |
| 2005/0129817 A1 | 6/2005 | Malecha |
| 2005/0175745 A1 | 8/2005 | Zawistowski |
| 2005/0208191 A1 | 9/2005 | Saimanohar |
| 2005/0222406 A1 | 10/2005 | Haji Begli |
| 2006/0003071 A1 | 1/2006 | Faa |
| 2006/0045937 A1 | 3/2006 | Slesinski |
| 2006/0088628 A1 | 4/2006 | Dekker |
| 2006/0088640 A1 | 4/2006 | McWatters |
| 2006/0088641 A1 | 4/2006 | Wendel |
| 2006/0210687 A1 | 9/2006 | Lundberg |
| 2006/0228455 A1 | 10/2006 | Garza-Lopez |
| 2006/0233923 A1 | 10/2006 | Campbell |
| 2006/0246202 A1* | 11/2006 | Karwowski ............. A23L 7/117 426/621 |
| 2007/0087107 A1 | 4/2007 | Borders |
| 2007/0116847 A1 | 5/2007 | Gorski |
| 2007/0122536 A1 | 5/2007 | Fryirs |
| 2007/0141218 A1 | 6/2007 | Chatel |
| 2007/0184160 A1 | 8/2007 | Josef |
| 2007/0196524 A1 | 8/2007 | Isami |
| 2007/0202217 A1 | 8/2007 | Zukerman |
| 2007/0243301 A1 | 10/2007 | Barnett |
| 2007/0248739 A1 | 10/2007 | Abril |
| 2007/0269579 A1 | 11/2007 | Mingus |
| 2008/0032005 A1 | 2/2008 | Fu |
| 2008/0038442 A1 | 2/2008 | Peterson |
| 2008/0057157 A1 | 3/2008 | Almeida |
| 2008/0057158 A1 | 3/2008 | Catani |
| 2008/0085343 A1 | 4/2008 | Petty |
| 2008/0182003 A1 | 7/2008 | Baker |
| 2008/0182004 A1 | 7/2008 | Baker |
| 2008/0206424 A1 | 8/2008 | Villagran |
| 2008/0317933 A1 | 12/2008 | Williamson |
| 2009/0017168 A1 | 1/2009 | Treece |
| 2009/0106863 A1 | 4/2009 | Frohberg |
| 2009/0181127 A1 | 7/2009 | Minatelli |
| 2009/0208609 A1 | 8/2009 | Lawson |
| 2009/0252841 A1 | 10/2009 | Basker |
| 2009/0285961 A1 | 11/2009 | Tucek |
| 2010/0021609 A1 | 1/2010 | Mattson |
| 2010/0034926 A1 | 2/2010 | Frick |
| 2010/0075012 A1 | 3/2010 | Crowe |
| 2010/0215826 A1 | 8/2010 | Campbell |
| 2010/0266734 A1 | 10/2010 | Bows |
| 2010/0272875 A1 | 10/2010 | Wilkes |
| 2010/0297323 A1 | 11/2010 | Brooks |
| 2010/0303991 A1 | 12/2010 | Karwowski |
| 2010/0303997 A1 | 12/2010 | Fulton |
| 2011/0086145 A1 | 4/2011 | Rodriguez Campisto |
| 2011/0104356 A1 | 5/2011 | Coleman |
| 2011/0151066 A1 | 6/2011 | Messervey |
| 2011/0200736 A1 | 8/2011 | Yakubu |
| 2011/0236533 A1 | 9/2011 | Seguin-Laur |
| 2011/0244088 A1 | 10/2011 | Bortone |
| 2012/0015074 A1 | 1/2012 | Draganski |
| 2012/0015093 A1 | 1/2012 | Finney |
| 2012/0021113 A1 | 1/2012 | Villagran |
| 2012/0076893 A1 | 3/2012 | Asayama |
| 2012/0076895 A1 | 3/2012 | Kirejevas |
| 2012/0076909 A1 | 3/2012 | Waldner |
| 2012/0171351 A1 | 7/2012 | Solorio |
| 2012/0183646 A1 | 7/2012 | De Laat |
| 2012/0196021 A1 | 8/2012 | Anand |
| 2012/0269939 A1 | 10/2012 | Hahn |
| 2013/0095213 A1 | 4/2013 | Walters |

(56) References Cited

U.S. PATENT DOCUMENTS

| | | |
|---|---|---|
| 2013/0122174 A1 | 5/2013 | Miller |
| 2013/0142912 A1 | 6/2013 | Schopf |
| 2013/0156892 A1 | 6/2013 | Mussawir-Key |
| 2013/0156893 A1 | 6/2013 | Han |
| 2013/0183410 A1 | 7/2013 | Setton |
| 2013/0183432 A1 | 7/2013 | Finney |
| 2013/0196033 A1 | 8/2013 | Anand |
| 2013/0209648 A1 | 8/2013 | Mohanan |
| 2013/0251877 A1 | 9/2013 | Levin |
| 2013/0295249 A1 | 11/2013 | Lian |
| 2013/0309291 A1 | 11/2013 | Stoll |
| 2013/0316058 A1 | 11/2013 | Crowe |
| 2013/0323354 A1 | 12/2013 | Zhang |
| 2013/0323355 A1 | 12/2013 | Zhang |
| 2014/0017361 A1 | 1/2014 | Messervey |
| 2014/0023768 A1 | 1/2014 | Waldner |
| 2014/0030376 A1 | 1/2014 | Caws |
| 2014/0065264 A1 | 3/2014 | Do |
| 2014/0093617 A1 | 4/2014 | Hynes |
| 2014/0093622 A1 | 4/2014 | Chang |
| 2014/0113031 A1 | 4/2014 | Lee |
| 2014/0120234 A1 | 5/2014 | Minatelli |
| 2014/0154363 A1 | 6/2014 | Duffy |
| 2014/0193565 A1 | 7/2014 | Ward |
| 2014/0220218 A1 | 8/2014 | Coleman |
| 2014/0272007 A1 | 9/2014 | Kanafani |
| 2014/0287101 A1 | 9/2014 | Reichkitzer |
| 2014/0308401 A1 | 10/2014 | Tam |
| 2014/0322390 A1 | 10/2014 | Papanastasiou |
| 2014/0322392 A1 | 10/2014 | Haskins |
| 2014/0335228 A1 | 11/2014 | Guerrero |
| 2015/0017286 A1 | 1/2015 | Ural |
| 2015/0208699 A1 | 7/2015 | Johnson |
| 2015/0245626 A1 | 9/2015 | Duffy |
| 2015/0264963 A1 | 9/2015 | Duffy |
| 2015/0272176 A1 | 10/2015 | Duffy |
| 2015/0366257 A1 | 12/2015 | Manchuliantsau |
| 2016/0128368 A1* | 5/2016 | Jump .................. A23L 33/21 426/93 |
| 2016/0192683 A1* | 7/2016 | Arnoff .................. A23L 19/10 426/72 |
| 2016/0309752 A1* | 10/2016 | Lamikanra ............ A23L 29/212 |
| 2017/0135387 A1 | 5/2017 | Treece |
| 2017/0245539 A1 | 8/2017 | Do |

FOREIGN PATENT DOCUMENTS

| | | |
|---|---|---|
| EP | 1065944 | 1/2001 |
| EP | 1541026 | 6/2005 |
| EP | 1906740 | 4/2008 |
| EP | 2229822 | 9/2010 |
| EP | 2424387 | 3/2012 |
| EP | 2430924 | 3/2012 |
| FR | 2222027 | 10/1974 |
| JP | S62198361 | 9/1987 |
| RU | 2414146 | 3/2011 |
| RU | 2433621 | 11/2011 |
| WO | 1998053704 | 12/1998 |
| WO | 2003079813 | 10/2003 |
| WO | 2005087018 | 9/2005 |
| WO | 2007099506 | 9/2007 |
| WO | 2009009720 | 1/2009 |
| WO | 2009075575 | 6/2009 |
| WO | 2009137839 | 11/2009 |
| WO | 2013036782 | 3/2013 |
| WO | 2014055522 | 4/2014 |
| WO | 2015130163 | 9/2015 |
| WO | 2015136382 | 9/2015 |
| WO | 2015196061 | 12/2015 |

OTHER PUBLICATIONS

Response to Communication under Rules 161(1) and 162 EPC dated Jul. 18, 2019, for corresponding European Application No. 17740471.2 (17 pgs.).

Communication Pursuant to Article 94(3) EPC and Annex to the Communication dated Jan. 21, 2020, for European Application No. 17740471.2 (6 pgs.).

Communication under Rule 71(3) EPC dated Jul. 28, 2020, for European Application No. 17740471.2 (155 pgs.).

Response to Communication Pursuant to Article 94(3) EPC dated Feb. 21, 2020, for European Application No. 17740471.2 (69 pgs.).

Russian Office Action dated Oct. 16, 2019, for Russian Application No. 2018141154 with English Translation (15 pgs.).

* cited by examiner

BAKED SAVORY FOOD COMPOSITION COMPRISING SHREDDED ROOT VEGETABLE AND METHOD OF MAKING THE SAME

CROSS REFERENCE TO RELATED APPLICATIONS

This application is a U.S. national phase application of International Application No. PCT/IB2017/000787, filed Jun. 5, 2017, which claims the benefit of U.S. Provisional Application No. 62/345,851, filed on Jun. 5, 2016, and U.S. Provisional Application No. 62/355,254, filed on Jun. 27, 2016, which are each hereby incorporated herein by reference in their entirety.

FIELD

The present application generally relates to food compositions having a loose, crunchy texture and that are essentially free of hydrocolloid gums and sugar syrups. More particularly, the present application relates food compositions having a loose, crunchy texture and comprising a natural binder composition that includes high amounts of shredded root vegetable.

BACKGROUND

Conventional binder compositions, used, for example, in snack foods such as snack bars, granola bars, meal replacement bars, clusters, and the like generally include large amounts of added sugar, corn syrup, or other nutritive sweeteners, or hydrocolloid gums, such as guar gum or xanthan gum, added protein, and/or added fiber, to provide the viscosity and cohesion to maintain a desired shape of the snack food. The high binding ability of these traditional binders is often used to bind together large particulates and inclusions, such as, for example, nuts, seeds, granola, and the like, to form the snack bars, granola bars, meal replacement bars, clusters, and the like. However, there are a number of disadvantages to the traditional binder compositions described above. First, the incorporation of high amounts of added sugar, syrups, or other nutritive sweeteners in a food product can undesirably result in higher calories and a sweet flavor profile, which can result in limited applicability for savory food products and low calorie, all natural products. Second, snack food products containing traditional binder compositions can result in products having a hard, dense texture, which may be difficult to bite or chew, or alternatively, the product may have a chewy texture, which may be also undesirable to the consumer.

Thus, there remains a need for improved binder compositions that offer the viscosity, cohesion, and functional properties effective to loosely bind together natural ingredients and inclusions, such as, for example, seeds, vegetable pieces, nuts, grains, herbs, and the like, to form and maintain a desired shape of a food composition, while also providing the food composition with a loose, crunchy texture and a multi-textural chew, without the high caloric content and/or high levels of sweetness from sugar syrups and/or high amounts of added sugars and hydrocolloid gums used in traditional binder compositions.

SUMMARY

In one approach, a baked food composition is provided that exhibits an unexpectedly loose, crunchy texture and multi-textural chew. The baked composition comprises a high amount of inclusions, such as, for example, one or more grains, legumes, seeds, nuts, vegetables, fruits, herbs, and the like, which are bound together by a binder component comprising low amounts of oil, added sugar and flour. Preferably, the food composition is essentially free of hydrocolloid gums and sugar syrups. In some approaches, at least a portion of the inclusion component may be in included in an expanded, or otherwise lower density, form such as, for example, puffs, crisps, flakes, dried pieces, and the like. The inventors discovered that combining inclusions, at least a portion of which are lower density inclusions such as, for example, puffed grains, rice crisps, dried vegetable pieces, legume flakes, and the like, with high amounts of shredded root vegetable, and low levels of flour, oil, and water, results in a natural, baked food composition having visibly identifiable shreds and inclusions, while also exhibiting an unexpectedly loose, crunchy texture and multi-textural chew.

In some approaches, a method of making a baked food composition includes forming a loosely agglomerated mass by combining an inclusion component, as described above, with high amounts of shredded root vegetable and low levels of flour, oil, and water. The loosely agglomerated mass may be shaped to form a shaped agglomerated mass using any process that allows shaping and/or sizing of the food composition that maintains integrity of the inclusions and does not unacceptably crush or macerate the inclusions during forming. For example, in some approaches, the agglomerated mass may be formed using a rotary depositing process. In other approaches, the agglomerated mass may be formed using a bar sheeting/cutting process. The inventors found that using one or more expanded, or otherwise lower density, inclusions in place of one or more flour components, and in combination with the binder component described above, while maintaining the structural integrity of the expanded, or otherwise lower density inclusions during processing and forming, a food composition having a lower density than traditional baked food compositions comprising agglomerated inclusions can be achieved, while also providing a unique loose, crunchy texture and multi-textural chew. Following forming, the agglomerated mass may be baked to a moisture content of about 4% or less, and in some approaches 3% or less, by weight of the food composition. In some approaches, the food composition may have a density of no more than about 0.80 g/cc, in some approaches no more than about 0.70 g/cc, in some approaches no more than about 0.60 g/cc, in some approaches about 0.60 g/cc to about 0.80 g/cc, and in some approaches, about 0.50 g/cc to about 0.70 g/cc.

In some approaches, the food composition has a Brabender particle size distribution of about 5% or less by weight on a 4 mm (5 mesh) U.S. Standard Sieve, about 30% or less by weight on a 2.36 mm (8 mesh) U.S. Standard Sieve, at least about 25% by weight on a 1.4 mm (12 mesh) U.S. Standard Sieve, at least about 20% by weight on a 0.85 mm (20 mesh) U.S. Standard Sieve, and about 25% or less by weight through a 0.85 mm (20 mesh) U.S. Standard Sieve.

In some approaches, the food composition has a total porosity of at least about 30% by area of the food composition and a closed porosity of about 25% or less by area of the food composition.

In some approaches, a baked savory food composition has an inclusion component comprising one or more expanded inclusions and a shredded component comprising shredded root vegetable, where the shredded component comprises at least about 20% by weight of the food composition. The food composition may also have a binder component comprising no more than about 30% flour by weight of the food composition, no more than about 20% oil by weight of the food composition, and no more than about 20% added sugar, and in some approaches no more than about 15% added sugar by weight of the food composition, the binder component agglomerating the inclusion component and the shredded component. In some approaches, the food composition comprises no more than about 60% of the binder component, in some approaches no more than about 50% of the binder component, and in some approaches no more than about 40% of the binder component, by weight of the food composition. Preferably, the food composition has a moisture content of no more than about 4%, and in some approaches no more than about 3% moisture by weight of the food composition.

In some approaches, the combined weight of the inclusion component and the shredded component may comprise at least about 30%, and in some approaches at least about 40% by weight of the food composition.

In some approaches, the food composition may include at least about 5% of the inclusion component by weight of the food composition.

In some approaches, the food composition may include at least about 5% of the one or more expanded inclusions by weight of the food composition. In other approaches, the food composition may include at least about 10% of the one or more expanded inclusions by weight of the food composition. The one or more expanded inclusions may include, for example, at least one of grains, legumes, seeds, vegetables, fruits, and combinations thereof. The one or more expanded inclusions may include, for example, at least one of puffs, crisps, flakes, freeze dried dehydrated pieces, and combinations thereof.

In some approaches, the inclusion component may include one or more non-expanded inclusions comprising at least one of grains, legumes, seeds, nuts vegetables, fruits, herbs, and combinations thereof. In some approaches, the food composition may include at least about 5% of the one or more non-expanded inclusions by weight of food composition.

In some approaches, the food composition may include no more than about 25% flour by weight of the food composition. In some approaches, the flour may include wheat flour.

In some approaches, the food composition may include about 20% to about 50% of the shredded component by weight of the food composition. In some approaches, the food composition may include at least about 15% of the shredded root vegetable by weight of the food composition, and in some approaches at least about 20% of the shredded root vegetable by weight of the food composition.

In some approaches, the shredded root vegetable may include a shredded root vegetable selected from the group consisting of sweet potato, carrot, parsnip, beet, yam, turnip, rutabaga, radish, Jerusalem artichoke, ginger, and combinations thereof.

In some approaches, the shredded component may include coconut in an amount of at least about 2% by weight of the food composition, in some approaches at least about 5% by weight of the food composition, and in some approaches at least about 10% by weight of the food composition.

In some approaches, the shredded component may include shreds having an average thickness of about 2.5 mm or less, an average width of about 2.5 mm or less, and a length that is greater than the average thickness and average width of the shreds.

In some approaches, the shredded component may include shreds having an average thickness of about 2.0 mm or less, an average width of about 2.0 mm or less, and a length that is greater than the average thickness and average width of the shreds.

In some approaches, the shreds in the shredded component may have an average thickness of at least about 1.0 mm. For example, the shreds may have an average thickness of from about 1.0 mm to about 2.5 mm, and in some approaches from about 1.0 mm to about 2.0 mm. In some approaches, the shreds may have an average width of at least about 1.0 mm. For example, the shreds may have an average width of from about 1.0 mm to about 2.5 mm, and in some approaches from about 1.0 mm to about 2.0 mm.

In some approaches, the shredded component may include shreds having an average thickness to width ratio of about 1:1. In some approaches, the shredded component may include shreds having an average thickness to length ratio of at least about 1:4.

In some approaches, the shredded component may be included in a dehydrated form. For example, the shredded component have a moisture content of about 5% or less by weight of the shredded component, and in some approaches a moisture content of about 3% or less by weight of the shredded component.

In some approaches, the food composition may have a density of no more than about 0.80 g/cc.

In some approaches, the food composition may have a thickness of about 8 mm to about 12 mm. In some approaches, the food composition may be in the shape of a bar having a length that is greater than a thickness of the bar and greater than a width of the bar. In some approaches, the food composition may have a thickness to width ratio of about 1:2 to about 1:4.

In some approaches, at least a portion of the shreds and at least a portion of the one or more expanded inclusions maintain integrity and are visible in the food composition.

In some approaches, the food composition may be free of hydrocolloid gums and/or sugar syrups. In some approaches, the food composition may also be free of added starches. In some approaches, the food composition may be free of added protein and fiber.

In some approaches, the food composition may have a Brabender particle size distribution of about 5% or less by weight on a 4 mm (5 mesh) U.S. Standard Sieve, about 30% or less by weight on a 2.36 mm (8 mesh) U.S. Standard Sieve, at least about 25% by weight on a 1.4 mm (12 mesh) U.S. Standard Sieve, at least about 20% by weight on a 0.85 mm (20 mesh) U.S. Standard Sieve, and about 25% or less by weight through a 0.85 mm (20 mesh) U.S. Standard Sieve.

In some approaches, the food composition may have a total porosity of at least about 30% by area of the food composition and a closed porosity of about 25% or less by area of the food composition.

In some approaches, a multi-textural baked savory food composition may include about 5% to about 15% expanded inclusions by weight of the food composition, about 15% to about 30% shredded root vegetable by weight of the food composition, about 5% to about 20% shredded coconut by weight of the food composition, no more than about 30% flour by weight of the food composition, no more than about 20% oil by weight of the food composition, and no more than about 15% added sugar by weight of the food composition, wherein the food composition has a moisture content of no more than about 3% by weight of the food composition.

In other approaches, a multi-textural baked savory food composition may include about 5% to about 15% expanded inclusions by weight of the food composition, about 15% to about 30% shredded root vegetable by weight of the food composition, about 2% to about 15% shredded coconut by weight of the food composition, no more than about 30% flour by weight of the food composition, no more than about 20% oil by weight of the food composition, and no more than about 20% added sugar by weight of the food composition, wherein the food composition has a moisture content of no more than about 4% by weight of the food composition.

A method of making a baked savory food composition is also provided. The method may comprise forming a loosely agglomerated mass by combining: (i) an inclusion component comprising one or more expanded inclusions; (ii) a shredded component comprising shredded root vegetable, the shredded component comprising at least about 20% by weight of the loosely agglomerated mass; and (iii) a binder component comprising no more than about 30% flour by weight of the loosely agglomerated mass, no more than about 20% water by weight of the loosely agglomerated mass, no more than about 15% oil by weight of the loosely agglomerated mass, and no more than about 20% added sugar by weight of the loosely agglomerated mass. In some approaches no more than about 15% added sugar by weight of the loosely agglomerated mass is included in the loosely agglomerated mass. At least a portion of the loosely agglomerated mass maybe shaped to form a shaped agglomerated mass, and the shaped agglomerated mass is baked to a moisture content of about 4% or less, and in some approaches about 3% or less by weight of the food composition.

In some approaches, the combined weight of the inclusion component and the shredded component may comprise at least about 25%, in some approaches at least about 30%, and in some approaches at least about 40% by weight of the loosely agglomerated mass.

In some approaches, the loosely agglomerated mass may comprise no more than about 65% of the binder component, in some approaches no more than about 60% binder component, and in some approaches no more than about 50% of the binder component, and in some approaches no more than about 45% of the binder component by weight of the loosely agglomerated mass.

In some approaches, the loosely agglomerated mass may include at least about 5% of the inclusion component by weight of the loosely agglomerated mass.

In some approaches, the loosely agglomerated mass may include at least about 5% of the one or more expanded inclusions by weight of the loosely agglomerated mass, in some approaches at least about 10% of the one or more expanded inclusions by weight of the loosely agglomerated mass. The one or more expanded inclusions may include, for example, at least one of grains, legumes, seeds, vegetables, fruits, and combinations thereof. The one or more expanded inclusions may include, for example, at least one of puffs, crisps, flakes, freeze dried dehydrated pieces, and combinations thereof.

In some approaches, the inclusion component may include one or more non-expanded inclusions comprising at least one of grains, legumes, seeds, nuts, vegetables, fruits, herbs, and combinations thereof. In some approaches, the loosely agglomerated mass may include at least about 5% of the one or more non-expanded inclusions by weight of the loosely agglomerated mass.

In some approaches, the loosely agglomerated mass may include no more than about 25% flour by weight of the loosely agglomerated mass. In some approaches, the flour may include wheat flour.

In some approaches, the shredded root vegetable may include a shredded root vegetable selected from the group consisting of sweet potato, carrot, parsnip, beet, yam, turnip, rutabaga, radish, Jerusalem artichoke, ginger, and combinations thereof.

In some approaches, the loosely agglomerated mass may include at least about 15% of the shredded root vegetable by weight of the loosely agglomerated mass, and in some approaches at least about 20% of the shredded root vegetable by weight of the loosely agglomerated mass.

In some approaches, the shredded component may include coconut in an amount of at least about 2% by weight of the loosely agglomerated mass, in some approaches in an amount of at least about 5% by weight of the loosely agglomerated mass, and in some approaches in an amount of at least about 10% by weight of the loosely agglomerated mass.

In some approaches, the shredded component may include shreds having an average thickness of about 2.5 mm or less, an average width of about 2.5 mm or less, and a length that is greater than the average thickness and average width of the shreds.

In some approaches, the shredded component may include shreds having an average thickness of about 2.0 mm or less, an average width of about 2.0 mm or less, and a length that is greater than the average thickness and average width of the shreds.

In some approaches, the shredded component may include shreds having an average thickness to width ratio of about 1:1. In some approaches, the shredded component may include shreds having an average thickness to length ratio of at least about 1:4.

In some approaches, the shredded component may be included in a dehydrated form. For example, the shredded component have a moisture content of about 5% or less by weight of the shredded component, and in some approaches a moisture content of about 3% or less by weight of the shredded component.

In some approaches, the combining step may include combining the inclusion component with the shredded component to form a dry mixture, and adding the oil and water to the dry mixture, in succession, to form the loosely agglomerated mass.

In some approaches, the loosely agglomerated mass may have a moisture content of about 25% or less by weight of the loosely agglomerated mass.

In some approaches, the shaped agglomerated mass may have a density of about 0.90 g/cc or less.

In some approaches, the shaped agglomerated mass may be formed using a process that maintains integrity of at least a portion of the one or more expanded inclusions and at least a portion the shreds during forming.

In some approaches, at least a portion of the shreds and at least a portion of the one or more expanded inclusion are visible in the food composition. For example, in some approaches, the shaped agglomerated mass may be formed using a bar sheeting process. In other approaches, the shaped agglomerated mass may be formed using a rotary depositing process.

In some approaches, the food composition may have a density of no more than about 0.80 g/cc.

In some approaches, the food composition may have a thickness of about 8 mm to about 12 mm. In some approaches, the food composition may be in the shape of a bar having a length that is greater than a thickness of the bar and greater than a width of the bar. In some approaches, the food composition may have a thickness to width ratio of about 1:2 to about 1:4.

In some approaches, the food composition may be free of hydrocolloid gums and/or sugar syrups. In some approaches, the food composition may also be free of added starches. In some approaches, the food composition may be free of added protein and fiber.

In some approaches, the food composition may have a Brabender particle size distribution of about 5% or less by weight on a 4 mm (5 mesh) U.S. Standard Sieve, about 30% or less by weight on a 2.36 mm (8 mesh) U.S. Standard Sieve, at least about 25% by weight on a 1.4 mm (12 mesh) U.S. Standard Sieve, at least about 20% by weight on a 0.85 mm (20 mesh) U.S. Standard Sieve, and about 25% or less by weight through a 0.85 mm (20 mesh) U.S. Standard Sieve.

In some approaches, the food composition may have a total porosity of at least about 30% by area of the food composition and a closed porosity of about 25% or less by area of the food composition.

DETAILED DESCRIPTION

Figure 1:
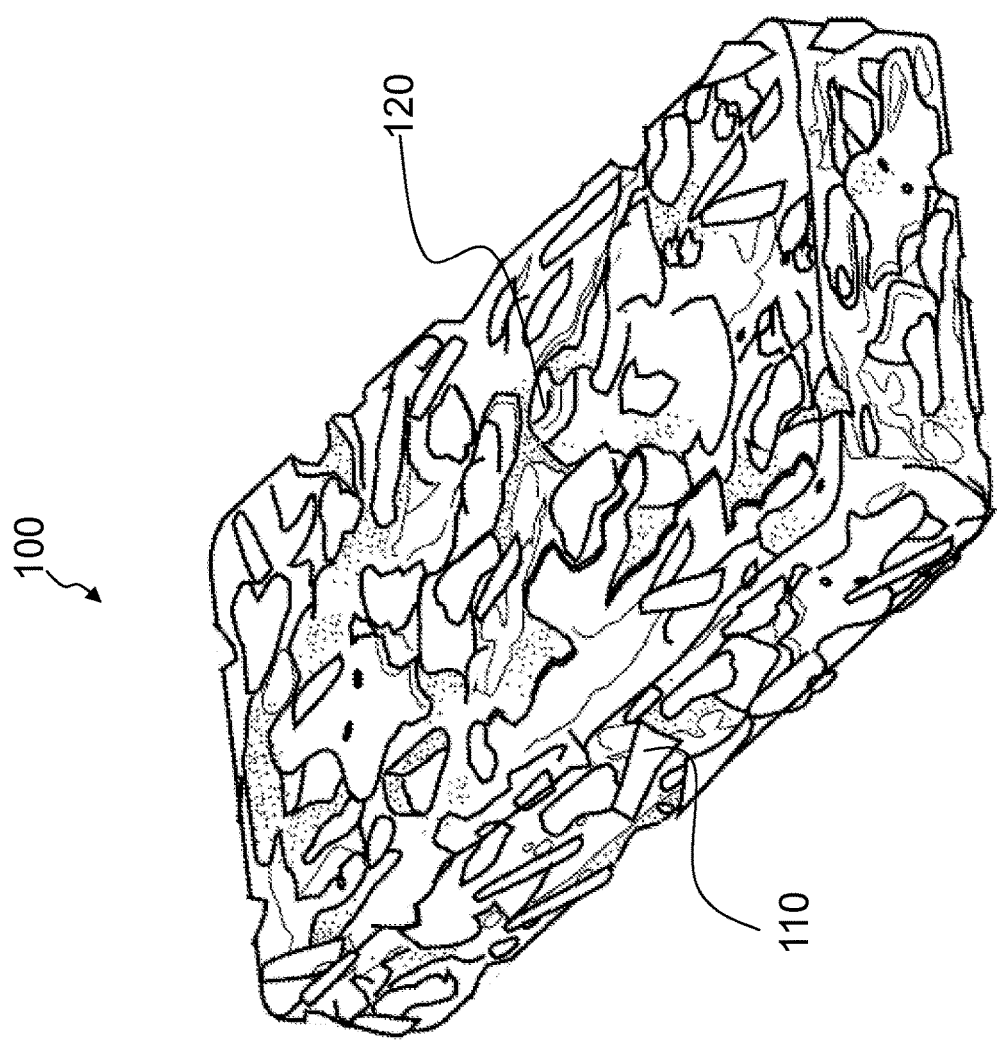
FIG. 1 is a perspective view of an exemplary food composition in the shape of a food bar.

The aforementioned summary and the following description are not to be taken in a limiting sense, but is made merely for the purpose of describing the general principles of exemplary embodiments and approaches. Reference throughout this specification to "one approach," "an approach," "some approaches", "an implementation", "some implementations", "some applications", or similar language means that a particular feature, component, property, or characteristic described in connection with the approach is included in at least one approach of the present invention. Thus, appearances of the phrases "in one approach," "in an approach," "in some approaches", "in some implementations", and similar language throughout this specification may, but do not necessarily, all refer to the same embodiment. In fact, it should be understood that a particular feature, component, property, or characteristic described herein with respect to one or more approaches, implementation, or applications is combinable with any other feature, component, property, or characteristic described herein in any combination unless explicitly stated otherwise.

Generally, a baked food composition is provided having one or more visible inclusions and exhibiting an unexpectedly loose, crunchy texture and a multi-textural chew. In some approaches, the food composition may comprise a savory food composition wherein a consumer would not perceive a high level of sweetness when consuming the food composition. Although the savory food composition may not include high levels of added sugar, in some approaches the savory food composition may nevertheless have a perceptible sweetness. For example, components that contain naturally occurring sugars and may have a perceptible sweetness, such as, for example, various fruits, and even sweet potato, may be included in the savory food composition, which may provide, or otherwise contribute to, the perceptible sweetness of the savory food composition, alone or in combination with the added sugar. In addition, various toppings, glazes, and coatings may also be applied to the savory food composition, which may also contribute to a perception of sweetness. The food composition may comprise any baked food, such as, for example, snack foods, snack bars, cereal bars, meal replacement bars, granola clusters, granola bars, and the like. Generally, the food composition can include any food composition where high amounts of natural food particulates, pieces, and the like are agglomerated to form a food product.

In some approaches, high amounts of an inclusion component and a shredded component are agglomerated by a binder component comprising low amounts of water, oil, sugar, and flour. The agglomerated ingredients are baked to a low moisture content of about 4% or less by weight of the final product, in some approaches 3% or less by weight of the final product, and in some approaches about 2% or less by weight of the final product. Preferably, the food composition is essentially free of hydrocolloid gums, sugar syrups, and added starch, protein, and fiber. In some approaches, the food composition may include less than 1% added starch by weight of the final product.

As used herein, "added," as used when referring to ingredients in the food composition, for example, to describe "added sugar", "added starch", and the like, is intended to mean an additional amount of a component that may be naturally present in one of the ingredients, and is added to the food composition during or after processing. As used herein, "essentially free" refers to less than 5% by weight, preferably less than 1% by weight, and most preferably none. As used herein, the terms "binder," "binder composition," and "binder component" is intended to mean a substance that produces or promotes cohesion in loosely assembled ingredients. Because the binder component described herein is intended to be used in the production of food products, it is preferably a food-grade binder component. Although snack food bars, cereal bars, meal replacement bars, and the like, are some preferred applications of the shredded root vegetable-based binder component described herein, any other type food product normally incorporating a binder component is contemplated. Of course, the concentration of the binder component can be adapted depending on its use or the product in which it is incorporated.

The unique loose, crunchy, multi-textural chew of the baked food composition described herein is achieved, in part, by using a specific combination of natural particulate ingredients and specific process parameters to form a dough (which may also be described herein as an "agglomerated mass" or a "dough-like agglomeration") having low amounts of added water, sugar, oil, and flour and having high porosity. Traditionally high amounts of added water/and or added sugars/sugar syrups have been used in dough compositions/agglomerations of particulates to improve binding of various ingredients and particulates of the dough. However, while not wishing to be limited by theory, as the water content of a dough increases, the density of the dough may also increase, which can result in baked food compositions having a dense, hard, texture, which may be difficult to bite or chew. Similarly, high amounts of added sugar, or other nutritive sweeteners, in a dough can result in a baked food composition that is hard and glassy, which may also be difficult to bite and chew. High amounts of flour and added starches may also contribute to a hard, dense product.

The inventors unexpectedly found that a binder component having low levels of water, added sugar, oil and flour, in combination with high amounts of a thinly shredded component provides a synergistic effect whereby various inclusions and particulates may be effectively agglomerated to form a shaped food composition without the need for high levels of added water, sugar (including sugar syrups and other nutritive sweeteners), added starches, milk or animal protein, and hydrocolloid gums. While not wishing to be limited by theory, it is believed that the thinly shredded component, such as for, example, thinly shredded root vegetable, is able to efficiently hydrate due to a high surface area of the shreds, providing a matrix or network to entrap the other particulates, such as, for example, puffed grains, crisps, and the like, to form an agglomerated mass. The thinly shredded component also provides agglomerating functionality due to its hydrophilic nature and its ability to absorb oil due to the presence of fiber. The combination of high amounts of the shredded component with low amounts of added sugar, water, and flour, is effective to loosely agglomerate various sizes and densities of inclusions, a portion of which may include puffed or otherwise expanded inclusions, to form a low density, agglomerated mass having high porosity, thereby achieving a baked food composition having a lower density and a more desirable mouthfeel.

The shredded component may include any shredded plant-based fibrous material, such as, for example, shredded vegetables and fruits, in any combination, and may be selected based on, for example, a target taste profile, nutritional targets, consistency, and color. Preferably, the shredded component includes one or more of any shredded root vegetable, including, for example, sweet potato, carrot, parsnip, beet, yam, turnip, rutabaga, radish, Jerusalem artichoke, ginger, and the like. In some approaches, the shredded root vegetable may have a sugar content of about 40% or less by weight of the shredded root vegetable, wherein the sugar content includes fructose, glucose, sucrose, maltose, and/or lactose contents. In some approaches, the shredded root vegetable may have a protein content of at least about 6% by weight of the shredded root vegetable. A non-limiting example of a root vegetable having a sugar content of about 40% or less and a protein content of at least about 6% includes sweet potato. In some approaches, shredded sweet potato comprising shreds having a fat content of greater than 1% by weight of the shred may be used. In some approaches, shredded sweet potato comprising shreds having an average bulk density of about 0.21-0.26 g/cc may be used.

In some approaches, the shredded component may include, for example, shredded coconut. As used herein, the term "coconut" is intended to refer to the part of the coconut that is commonly known as the "coconut meat." In some approaches, the shredded coconut may be the only shredded material in the shredded component. Preferably, the shredded coconut is included in combination with one or more shredded root vegetables, such as shredded sweet potato. The relative amounts of the shredded materials comprising the shredded component may be adjusted relative to one another based on, for example, desired taste profile, nutritional targets, consistency, and color.

In some approaches, the shredded component may be present in the final baked food composition in an amount of at least about 20% by weight of the baked food composition, in some approaches in an amount of at least about 25% by weight of the baked food composition, in some approaches in an amount of at least about 30% by weight of the baked food composition, in some approaches in an amount of at least about 35% by weight of the baked food composition, and in some approaches in an amount of at least about 40% by weight of the baked food composition. In some approaches, the amount of the shredded component in the final baked food composition may be from about 20% to about 50% by weight of the baked food composition, in some approaches from about 25% to about 45% by weight of the baked food composition, in some approaches from about 25% to about 40% by weight of the baked food composition, and in some approaches from about 30% to about 40% by weight of the baked food composition. In some approaches, the shredded component may comprise a single shredded material, such as, for example, shredded sweet potato, and may be included in amounts consistent with the above amounts and ranges. In some embodiments, a second shredded material may be included in the shredded component, such as, for example, shredded coconut. In cases where the shredded component comprises more than one shredded material, each of the respective shredded materials may be included in any amounts or combinations as long as the total amount of the shredded component remains consistent with the above amounts and ranges described with respect to the shredded component as a whole.

In some approaches, a first shredded material, such as, for example, a shredded root vegetable, may be present in the food composition in an amount of at least about 15%, in some approaches at least about 18%, and in some approaches at least about 20% by weight of the food composition. A second shredded material, such as, for example, shredded coconut, may be also present in the food composition in an amount of at least about 2%, in some approaches at least about 5%, and in some approaches at least about 10%. The first and second shredded materials may be included in any amount as long as the total amount of the shredded component remains consistent with the above amounts and ranges described with respect to the shredded component as a whole.

When the shredded component comprises shredded root vegetable, such as for example, shredded sweet potato, the shredded root vegetable may comprise shreds obtained from fresh root vegetable, processed shredded root vegetable, or combinations thereof. For example, some shreds may be obtained from a whole vegetables, which may include skins of the vegetables, while some shreds may be obtained from peeled or pieced root vegetables. The root vegetable may be fresh/raw, cooked, frozen, or canned. In some approaches, the shredded root vegetable included in the food composition may be dehydrated shredded root vegetable. In some approaches, the shredded root vegetable may be dehydrated shredded root vegetable that may be rehydrated during processing. In some approaches, the shredded root vegetable may have a moisture content of about 5% or less by weight of the shredded root vegetable, in another approach a moisture content of about 4% or less by weight of the shredded root vegetable, and in yet another approach a moisture content of about 3% or less by weight of the shredded root vegetable. In some approaches, the shredded root vegetable included in the food composition may comprise fresh shreds, which have not been dried or otherwise dehydrated. In such cases, the amount of water added to the dough during processing may be adjusted accordingly to account for the moisture contributed to the dough by the shredded root vegetable.

Generally, the shredded root vegetable comprises thin shreds that are light and flaky, and sufficiently thin in at least two dimensions to provide a relatively high surface area for hydration. For example, the shreds may be have an average thickness of about 2.5 mm or less, and in some approaches about 2.0 mm or less. In some approaches, the shreds may have an average thickness of at least about 1.0 mm. For example, the shreds may have an average thickness of from about 1.0 mm to about 2.5 mm, and in some approaches from about 1.0 mm to about 2.0 mm. The shreds may have an average width of about 2.5 mm or less, and in some approaches about 2.0 mm or less. In some approaches, the shreds may have an average width of at least about 1.0 mm. For example, the shreds may have an average width of from about 1.0 mm to about 2.5 mm, and in some approaches from about 1.0 mm to about 2.0 mm. In a non-limiting example, the shreds may have an average thickness of about 1.5 mm to about 2.5 mm, an average width of about 1.0 mm or less, and a variable length that is longer than the average width and/or the thickness of the shreds.

In some approaches, the length of the shred may be longer than the width and/or the thickness of the shred. For example, the shreds may have an average thickness and an average width of about 2 mm or less, and an average length that is greater than 2 mm, such as at least 4 mm. In some approaches, the average length of the shred may be a natural length of the material from which the shred was obtained. For example, a shred of sweet potato may have a length of the sweet potato from which the shred was obtained. In some approaches, the shreds may have a thickness to width ratio of about 1:1. In some approaches, the shreds may have a thickness and/or width to length ratio of at least about 1:4.

While not wishing to be limited by theory, the shredded root vegetables described herein exhibit superior binding due to their hydrophilic nature, their ability to absorb oil due to the presence of fiber, and the thin shape of the shreds, which allow for rapid, complete hydration of the shreds and which form a matrix or network to entrap inclusions to form a loose agglomerated mass. Notably, the inventors unexpectedly found that not all shred sizes are suitable for agglomerating the inclusions to form a lower density baked food composition that exhibits an unexpectedly loose, crunchy texture and multi-textural chew. Instead, as illustrated in Example 1, the ability of shredded root vegetables to form a loose agglomeration having a relatively low density that results in a food composition having a unique loose, crunchy texture and multi-textural chew, is limited at least, in part, by the thin dimensions of the shreds.

Example 1

In this Example, two dough-like agglomerations were obtained by combining the same amounts of water, sugar, oil, flour, inclusions, and shredded sweet potato in accordance with the amounts listed in Table 2 below. In Sample 1, exemplary sweet potato shreds having an average thickness of about 1.2 mm and an average width of about 2.4 mm were used. In Sample 2, comparative sweet potato shreds having an average thickness of 1.8 mm or more and an average width of about 2.8 mm were used. Both samples of dough-like agglomerations were processed using the same mixing, forming, and baking parameters. The results are presented in Table 1.

TABLE 1

Comparison of Shred Sizes

| | Sample 1 (Exemplary Sweet Potato Shreds) | Sample 2 (Comparative Sweet Potato Shreds) |
| --- | --- | --- |
| Average Shred width | 2.5 mm | 2.8 mm |
| Average Shred thickness | 1.2 mm | 1.8 mm |
| Forming | Relatively easy to slit/cut sweet potato during forming stage | Was difficult to slit/cut the sweet potato during the forming stage |
| Density of Shaped Agglomeration | 0.83 g/cc | 0.96 g/cc |
| Baked Product | Sweet potato was relatively easy to integrate into the dough matrix. Relatively easy to chew in the baked product. | Sweet potato did not fully integrate into the dough matrix. Hard to chew in the baked product. |

As shown in Table 1, using the exemplary sweet potato shreds having an average width of 2.5 mm and an average thickness of 1.2 mm in Sample 1 resulted in a relatively low density of the shaped dough-like agglomeration of 0.83 g/cc. The final baked product of Sample 1 was relatively easy to chew and the exemplary sweet potato shreds in Sample 1 were easy to slit/cut sweet potato during the forming stage, and were relatively easy to integrate into the agglomerated matrix. By contrast, Sample 2, which used the thicker comparative shreds, resulted in a shaped dough-like agglomeration having a higher density, at 0.96 g/cc, indicated a denser product than the dough-like agglomeration of Sample 1. The final baked product of Sample 2 was hard to chew, and the thicker comparative shreds used in Sample 2 were difficult to slit/cut during the forming stage, and did not fully integrate into the agglomerated matrix.

While not wishing to be limited by theory, the higher density of the dough-like agglomeration, the reduced workability of the comparative sweet potato shreds, and the hardness of the final baked product in Sample 2 are likely due to incomplete hydration of the thicker comparative shreds in Sample 2. It is believed that thicker shreds may take longer to hydrate and may not easily and/or fully incorporate into the agglomerated mass. Consequently, the thicker shreds result in a hard textured bite in the finished product. This hardness can be further exacerbated when the shreds have a high moisture content, such as, for example, about 6% to about 8% moisture by weight of the shreds.

Texture and density of the dough-like agglomeration and of the resulting final product is also dependent on the inclusions used to form the product. Inclusions may include, for example, grains, legumes, seeds, vegetables, fruits, nuts, herbs, or any other edible particulate matter. Without being limited by theory, it is believed that the loose, crunchy texture and multi-textural chew of the food composition described herein may be due, in part, to the presence of one or more expanded, or otherwise low density, inclusions in the dough agglomerate that maintain their integrity into the final product. Expanded inclusions may include any inclusion in which the surface area has been increased from the inclusion's original surface area. Examples of expanded inclusions include, but are not limited to, puffs, crisps, flakes, freeze dried dehydrated pieces, and the like. In some approaches, the expanded inclusions may include at least one of, for example, brown rice crisps, puffed amaranth, and puffed millet. In some approaches, the inclusion component may also include one or more non-expandable inclusions, including, for example, non-expanded grains, legumes, seeds, vegetables, fruits, nuts, herbs, or any other edible particulate matter.

In some approaches, the inclusion component may be present in the food composition in an amount of at least about 5% by weight of the food composition, in some approaches at least about 8% by weight of the food composition, and in some approaches at least about 10% by weight of the food composition. In some approaches, the inclusion component may be present in the food composition in an amount from about 5% to about 15% by weight of the food composition, at least a portion of which includes expanded inclusions. In some approaches, the inclusion component may include only expanded inclusions. In other approaches, the inclusion component may include both expanded and non-expanded inclusions. Preferably, the food composition comprises at least about 5% expanded inclusions by weight of the food composition, in some approaches at least 8% expanded inclusions, and in some approaches at least 10% expanded inclusions, in order to provide adequate air cells effective to obtain a crunchy texture and multi-textural chew. In some approaches, the food composition may also include at least about 2%, and in some embodiments at least about 5% non-expanded inclusions by weight of the final composition.

In some approaches, the total combined weight of the inclusion component and the shredded component is at least about 30% of the food composition, in some approaches at least about 40% of the food composition, in some approaches at least about 50% of the food composition, and in some approaches at least about 60% of the food composition. It was surprising and unexpected to the inventors that such a high amount of particulate matter (i.e., the inclusion component and the shredded component) could be effectively agglomerated and shaped using a binder component comprising such low amounts of added sugar, water, and flour. In some approaches, the food composition comprises no more than about 60% of the binder component, in some approaches no more than about 50% of the binder component, and in some approaches no more than about 40% of the binder component, by weight of the food composition.

The flour used as part of the binder component may include any flour or powder material made from various grains, legumes, tubers, and the like. For example, the flour may be derived from one or more of wheat, corn, bean, lentil, tuber, (e.g. potato), amaranth, barley, buckwheat, triticale, rye, millet, oats, rice, sorghum, teff, quinoa, and the like. Preferably, the flour includes wheat flour. However, in some embodiments the flour may be gluten-free. In some approaches, the flour may comprise whole grain flour. In some approaches, the flour may be enriched. In some approaches, the binder component comprises no more than about 30% flour by weight of the food composition, in some approaches no more than about 25% flour by weight of the food composition, and in some approaches no more than about 20% flour by weight of the food composition. In some approaches, the food composition comprises from about 15% to about 25% flour.

The binder component also includes no more than about 20% added sugar, and in some approaches no more than 15% added sugar, by weight of the food composition. In some approaches, the sugar may be granulated sugar. The amount of sugar may be adjusted based on, for example, the sweetness and/or calorie content of other components of the food composition, the target taste profile, and/or nutritional targets. Oil is also included in the binder component, and comprises no more than about 20% by weight of the food composition, and in some approaches no more than about 15% by weight of the food composition. Any edible, plant derived oil may be used. Preferably, the oil is canola oil. Flavored oils and oil extracts may also be used, depending on the desired taste profile.

The final moisture content of the baked food composition after baking may be no more than 4% by weight of the food composition, in some approaches no more than 3% by weight of the food composition, and in some approaches no more than 2% by weight of the food composition. The desired moisture may be achieved adjusting by the added water content during processing based on the moisture content of the other components of the food composition, as discussed in more detail below.

The food composition may also include a leavening agent, such as, for example, sodium bicarbonate, calcium bicarbonate, ammonium bicarbonate, baking powder, and/or mixtures thereof. In some approaches the leavening agent may be included in the food composition in amount of no more than 3%, and in some approaches no more than about 2% by weight of the food composition. Additional seasonings, spices, and salts may also be included in the food composition, as desired.

In embodiments where a low amount of starch may be added, the starch may be any suitable modified starch derived from any suitable starch source, such as corn, wheat, potato, tapioca, maize, sago, rice, and the like. In one approach, the starch may be derived from waxy starches, such as waxy corn, waxy maize, waxy rice, and waxy sorghum. Preferably the starch is a pre-gelatinized waxy corn starch. Added starch may be included in an amount less than 1% by weight of the food composition.

The food composition may have any suitable shape. For example, in some approaches, the food composition may have the shape of a rectangle, square, triangle, and the like, along with a thickness, which may be achieved using a bar/sheeting process. The food composition may also be a bar shape having a length that is greater than a thickness of the bar and greater than a width of the bar. In other approaches, the food composition may have shapes such as a round or oval shape, or an irregular shape, which may be achieved using a rotary deposit process.

The food composition may have a density of no more than about 0.80 g/cc, in some approaches a density of no more than about 0.70 g/cc, in some approaches a density of no more than about 0.60 g/cc, in some approaches a density of from about 0.30 g/cc to about 0.80 g/cc, in some approaches a density of from about 0.4 g/cc to about 0.70 g/cc., in some approaches a density of about 0.60 g/cc to about 0.80 g/cc, and in some approaches a density of from about 0.5 g/cc to about 0.70 g/cc. The food composition may comprise any thickness, although the preferred thickness of the composition is about 8 mm to about 12 mm. In some approaches, the thickness to width ratio of the food composition is about 1:2 to about 1:4.

The food composition may have a Brabender particle size distribution of about 5% or less, in some approaches about 4% or less, in some approaches about 3% or less, and in some approaches about 2% or less by weight on a 4 mm (5 mesh) U.S. Standard Sieve; about 30% or less, in some approaches about 25% or less, in some approaches about 20% or less, in some approaches about 10% to about 30%, in some approaches about 15% to about 25%, and in some approaches about 16% to about 22% by weight on a 2.36 mm (8 mesh) U.S. Standard Sieve; at least about 25%, in some approaches at least about 30%, in some approaches at least about 35%, in some approaches about 25% to about 50%, and in some approaches about 30% to about 45% by weight on a 1.4 mm (12 mesh) U.S. Standard Sieve; at least about 20%, in some approaches at least about 25%, in some approaches about 20% to about 30%, and in some approaches about 22% to about 29% by weight on a 0.85 mm (20 mesh) U.S. Standard Sieve; and about 25% or less, and in some approaches about 10% to about 25% by weight through a 0.85 mm (20 mesh) U.S. Standard Sieve.

In some approaches, the food composition may have a Brabender particle size distribution of about 5% or less by weight on a 4 mm (5 mesh) U.S. Standard Sieve, about 30% or less by weight on a 2.36 mm (8 mesh) U.S. Standard Sieve, at least about 25% by weight on a 1.4 mm (12 mesh) U.S. Standard Sieve, at least about 20% by weight on a 0.85 mm (20 mesh) U.S. Standard Sieve, and about 25% or less by weight through a 0.85 mm (20 mesh) U.S. Standard Sieve.

In some approaches, the food composition may have a Brabender particle size distribution such that at most about 5%, in some approaches at most about 4%, in some approaches at most about 3%, and in some approaches at most about 2% by weight of the particles are greater than 4 mm; at most about 30%, in some approaches at most about 25%, in some approaches at most about 20%, in some approaches about 10% to about 30%, in some approaches about 15% to about 25%, and in some approaches about 16% to about 22% by weight of the particles are greater than 2.36 mm but less than or equal to 4 mm; at least about 25%, in some approaches at least about 30%, in some approaches at least about 35%, in some approaches about 25% to about 50%, and in some approaches about 30% to about 45% by weight of the particles are greater than 1.4 mm but less than or equal to 2.36 mm; at least about 20%, in some approaches at least about 25%, in some approaches about 20% to about 30%, and in some approaches about 22% to about 29% by weight of the particles are greater than 0.85 mm but less than or equal to 1.4 mm; and at most about 25%, and in some approaches about 10% to about 25% by weight of the particles are less than or equal to 0.85 mm.

In some approaches, the food composition may have a Brabender particle size distribution such that at most about 5% by weight of the particles are greater than 4 mm, at most about 30% by weight of the particles are greater than 2.36 mm but less than or equal to 4 mm, at least about 25% by weight of the particles are greater 1.4 mm but less than or equal to 2.36 mm, at least about 20% by weight of the particles are greater than 0.85 mm but less than or equal to 1.4 mm, and at most about 25% by weight of the particles are less than or equal to 0.85 mm.

The food composition may have a total porosity of at least about 30%, in some approaches at least about 35%, in some approaches at least about 40%, in some approaches about 30% to about 60%, in some approaches about 35% to about 50%, and in some approaches about 40% to about 45% by area of the food composition. The food composition may have a closed porosity of about 25% or less, in some approaches about 20% or less, in some approaches about 5% to about 25%, and in some approaches about 5% to about 20% by area of the food composition.

Generally, at least a portion of the shreds from the shredded component and at least a portion of the expanded inclusions are visible on the surface of the food composition. For example, defined shapes of shreds and expanded inclusions may be visible on the surface as well as within the food composition when the food composition is cut or broken in half. For example, FIG. 1 shows a food composition 100 in the shape of a bar food having discernible shreds 110 and discernible expanded inclusions 120, both being visible on the surface of the food composition. Thus, it is important that the integrity of at least a portion of the expanded inclusions and shreds are maintained during processing.

As discussed above, the inventors discovered that combining high amounts of a shredded component and expanded inclusions, and low levels of flour, oil, and water, results in a natural, baked food composition having visible shreds and expanded inclusions, while also exhibiting an unexpectedly loose, crunchy texture and multi-textural chew. Tables 2 and 3 provide non-limiting examples of formulations that achieve the unique characteristics described above. It should be understood that the formulations in Tables 2 and 3 are only exemplary formulations and are not intended to be limiting.

TABLE 2

Baked Food Composition Generally

| Ingredient | % Dry Weight of the Baked Food Composition |
|---|---|
| Shredded root vegetable | 15-30% |
| Shredded coconut | 5-20% |
| Expanded inclusions | 5-25% |
| Non-expanded inclusions | up to 5% |
| Flour | up to 30% |
| Sugar | up to 15% |
| Oil | up to 20% |
| Leavening agent(s) | up to 2% |

TABLE 3

Baked Food Composition Generally

| Ingredient | % Dry Weight of the Baked Food Composition |
|---|---|
| Shredded root vegetable | 18-30% |
| Shredded coconut | 2-15% |
| Expanded inclusions | 5-15% |
| Non-expanded inclusions | up to 5% |
| Flour | 15-30% |
| Sugar | 8-20% |
| Oil | 8-20% |

TABLE 3-continued

Baked Food Composition Generally

| Ingredient | % Dry Weight of the Baked Food Composition |
| --- | --- |
| Leavening agent(s) | up to 2% |
| Corn starch | up to 1% |

A method of making a baked food composition having one or more visible inclusions and exhibiting an unexpectedly loose, crunchy texture and a multi-textural chew is also provided herein. In some approaches, the food composition may comprise a savory food composition wherein a consumer would not perceive a high level of sweetness when consuming the food composition. Although the savory food composition may not include high levels of added sugar, in some approaches, the savory food composition may nevertheless have a perceptible sweetness. For example, components that contain naturally occurring sugars and may have a perceptible sweetness, such as, for example, various fruits, and even sweet potato, may be included in the savory food composition, which may provide, or otherwise contribute to, the perceptible sweetness of the savory food composition, alone or in combination with the added sugar. In addition, various toppings, glazes, and coatings may also be applied to the savory food composition, which may also contribute to a perception of sweetness.

The food composition may comprise any baked food, such as, for example, snack foods, snack bars, cereal bars, meal replacement bars, granola clusters, granola bars, and the like. Generally, the food composition can include any food composition where high amounts of natural food particulates, pieces, and the like are agglomerated to form a food product, and may include any ingredients and/or combinations of ingredients described above. Preferably, the food composition is essentially free of hydrocolloid gums, sugar syrups, and added starch, protein, and fiber. In some approaches, the food composition may include less than 1% added starch by weight of the final product.

In some approaches, high amounts of an inclusion component and a shredded component are mixed with a binder component comprising low amounts of water, oil, added sugar, and flour to form a loosely agglomerated mass. The shredded component may include any shredded plant-based fibrous material, such as, for example, shredded vegetables and fruits, in any combination, and may be selected based on, for example, a target taste profile, nutritional targets, consistency, and color. Preferably, the shredded component includes one or more of any shredded root vegetable, including, for example, sweet potato, carrot, parsnip, beet, yam, turnip, rutabaga, radish, Jerusalem artichoke, ginger, and the like. In some approaches, the shredded root vegetable may have a sugar content of about 40% or less by weight of the shredded root vegetable, wherein the sugar content includes fructose, glucose, sucrose, maltose, and lactose contents. In some approaches, shredded root vegetable may have a protein content of at least about 6% by weight of the shredded root vegetable. A non-limiting example of a root vegetable having a sugar content of about 40% or less and a protein content of at least about 6% includes sweet potato. In some approaches, shredded sweet potato comprising shreds having a fat content of greater than 1% by weight of the shred may be used. In some approaches, shredded sweet potato comprising shreds having an average bulk density of about 0.21 g/cc to about 0.26 g/cc may be used.

In some approaches, the shredded component may include, for example, shredded coconut. In some approaches, the shredded coconut may be the only shredded material in the shredded component. Preferably, the shredded coconut is included in combination with one or more shredded root vegetables, such as shredded sweet potato. The relative amounts of the shredded materials comprising the shredded component may be adjusted relative to one another based on, for example, desired taste profile, nutritional targets, consistency, and color.

In some approaches, the shredded component may be present in the loosely agglomerated mass in an amount of at least about 20% by weight of the loosely agglomerated mass, in some approaches in an amount of at least about 25% by weight of the loosely agglomerated mass, in some approaches in an amount of at least about 30% by weight of the loosely agglomerated mass, in some approaches in an amount of at least about 35% by weight of the loosely agglomerated mass, and in some approaches in an amount of at least about 40% by weight of the loosely agglomerated mass. In some approaches, the amount of the shredded component in the loosely agglomerated mass may be from about 20% to about 50% by weight of the loosely agglomerated mass, in some approaches from about 25% to about 45% by weight of the loosely agglomerated mass, in some approaches from about 30% to about 40% by weight of the loosely agglomerated mass, and in some approaches from about 20% to about 40% by weight of the loosely agglomerated mass. In some approaches, the shredded component may comprise a single shredded material, such as, for example, shredded sweet potato, and may be included in amounts consistent with the above amounts and ranges. In some embodiments, a second shredded material may be included in the shredded component, such as, for example, shredded coconut. In cases where the shredded component comprises more than one shredded material, each of the respective shredded materials may be included in any amounts or combinations as long as the total amount of the shredded component remains consistent with the above amounts and ranges described with respect to the shredded component as a whole.

In some approaches, a first shredded material, such as, for example, a shredded root vegetable, may be present in the loosely agglomerated mass in an amount of at least about 15%, in some approaches at least about 18%, and in some approaches at least about 20% by weight of the loosely agglomerated mass. A second shredded material, such as, for example, shredded coconut, may be also present in the loosely agglomerated mass in an amount of at least about 2%, in some approaches at least about 5%, and in some approaches at least about 10%. The first and second shredded materials may be included in any amount combination as long as the total amount of the shredded component remains consistent with the above amounts and ranges described with respect to the shredded component as a whole.

When the shredded component comprises shredded root vegetable, such as for example, shredded sweet potato, the shredded root vegetable may comprise shreds obtained from fresh root vegetable, processed shredded root vegetable, or combinations thereof. For example, some shreds may be obtained from a whole vegetables, which may include skins of the vegetables, while some shreds may be obtained from peeled or pieced root vegetables. The root vegetable may be fresh/raw, cooked, frozen, or canned. In some approaches, the shredded root vegetable included in the food composition may be dehydrated shredded root vegetable. In some approaches, the shredded root vegetable may be dehydrated shredded root vegetable that may be rehydrated during processing. In some approaches, the shredded root vegetable may have a moisture content of about 5% or less by weight of the shredded root vegetable, in another approach a moisture content of about 4% or less by weight of the shredded root vegetable, and in yet another approach a moisture content of about 3% or less by weight of the shredded root vegetable. In some approaches, the shredded root vegetable included in the food composition may comprise fresh shreds, which have not been dried or otherwise dehydrated. In such cases, the amount of water added to the dough during processing may be adjusted accordingly to account for the moisture contributed to the dough by the shredded root vegetable.

Generally, the shredded root vegetable comprises thin shreds that are light and flaky, and sufficiently thin in at least two dimensions to provide a relatively high surface area for hydration. For example, the shreds may be have an average thickness of about 2.5 mm or less, and in some approaches about 2.0 mm or less. In some approaches, the shreds may have an average thickness of at least about 1.0 mm. For example, the shreds may have an average thickness of from about 1.0 mm to about 2.5 mm, and in some approaches from about 1.0 mm to about 2.0 mm. The shreds may have an average width of about 2.5 mm or less, and in some approaches about 2.0 mm or less. In some approaches, the shreds may have an average width of at least about 1.0 mm. For example, the shreds may have an average width of from about 1.0 mm to about 2.5 mm, and in some approaches from about 1.0 mm to about 2.0 mm. In some approaches, the length of the shred may be longer than the width and/or the thickness of the shred. For example, the shreds may have an average thickness and an average width of about 2 mm or less, and an average length that is greater than 2 mm, such as at least 4 mm. In some approaches, the average length of the shred may be a natural length of the material from which the shred was obtained. For example, a shred of sweet potato may have a length of the sweet potato from which the shred was obtained. In some approaches, the shreds may have a thickness to width ratio of about 1:1. In some approaches, the shreds may have a thickness and/or width to length ratio of at least about 1:4.

While not wishing to be limited by theory, the exemplary shredded root vegetables described herein exhibit superior binding due to their hydrophilic nature, their ability to absorb oil due to the presence of fiber, and the dimensions shreds, which allow for rapid, complete hydration of the shreds and which form a matrix or network to entrap inclusions to form a loose agglomerated mass. As discussed above, the inventors unexpectedly found that not all shred sizes are suitable for agglomerating the inclusions to form a lower density baked food composition that exhibits an unexpectedly loose, crunchy texture and multi-textural chew.

Texture and density of the dough-like agglomeration and of the resulting final product is also dependent on the inclusions used to form the product. Inclusions may include, for example, grains, legumes, seeds, vegetables, fruits, nuts, herbs, or any other edible particulate matter. Without being limited by theory, it is believed that the loose, crunchy texture and multi-textural chew of the food composition described herein may be due, in part, to the presence of one or more expanded, or otherwise low density, inclusions in the dough agglomerate that maintain their integrity into the final product. Expanded inclusions may include any inclusion in which the surface area has been increased from the inclusion's original surface area. Examples of expanded inclusions include, but are not limited to, puffs, crisps, flakes, freeze dried dehydrated pieces, and the like. In some approaches, the expanded inclusions may include at least one of, for example, brown rice crisps, puffed amaranth, and puffed millet.

The food composition includes an inclusion component, at least a portion of which comprises one or more expandable inclusions as described above. In some approaches, the inclusion component may also include one or more non-expandable inclusions, including, for example, non-expanded grains, legumes, seeds, vegetables, fruits, nuts, herbs, or any other edible particulate matter.

In some approaches, the inclusion component may be present in the loosely agglomerated mass in an amount of at least about 5% by weight of the loosely agglomerated mass, in some approaches at least about 8% by weight of the loosely agglomerated mass, in some approaches at least about 10% by weight of the loosely agglomerated mass. In some approaches, the inclusion component may be present in the loosely agglomerated mass in an amount from about 5% to about 15% by weight of the loosely agglomerated mass, at least a portion of which includes expanded inclusions. In some approaches, the inclusion component may include only expanded inclusions. In other approaches, the inclusion component may include both expanded and non-expanded inclusions. Preferably, the loosely agglomerated mass comprises at least about 5% expanded inclusions by weight of the food composition, in some approaches at least 8% expanded inclusions, and in some approaches at least 10% expanded inclusions, in order to provide adequate air cells effective to obtain a crunchy texture and multi-textural chew. In some approaches, the loosely agglomerated mass may also include at least about 2%, and in some embodiments at least about 5% non-expanded inclusions by weight of the loosely agglomerated mass.

In some approaches, the total combined weight of the inclusion component and the shredded component is at least about 25%, in some approaches at least about 30%, in some approaches at least about 40%, in some approaches at least about 50%, and in some approaches at least about 60% by weight of the loosely agglomerated mass. It was surprising and unexpected to the inventors that such a high amount of particulate matter (i.e., the inclusion component and the shredded component) could be effectively agglomerated and shaped using a binder component comprising such low amounts of added sugar, water, and flour. In some approaches, the binder component is included in an amount of no more than 65%, in some approaches no more than about 60%, in some approaches no more than about 50%, and in some approaches no more than about 40% by weight of the loosely agglomerated mass.

The flour used as part of the binder component may include any flour or powder material made from, for example, grains, legumes, tubers, and the like. For example, the flour may be derived from one or more of wheat, corn, bean, lentil, tuber, (e.g. potato), amaranth, barley, buckwheat, triticale, rye, millet, oats, rice, sorghum, teff, quinoa, and the like. Preferably, the flour includes wheat flour. However, in some embodiments the flour may be gluten-free. In some approaches, the flour may comprise whole grain flour. In some approaches, the flour may be enriched. In some approaches, the loosely agglomerated mass comprises no more than about 30% flour by weight of the loosely agglomerated mass, in some approaches no more than about 25% flour by weight of the loosely agglomerated mass, and in some approaches no more than about 20% flour by weight of the loosely agglomerated mass. In some approaches, the loosely agglomerated mass comprises from about 15% to about 25% flour.

The binder component also includes no more than about 20% added sugar, and in some approaches no more than 15% added sugar by weight of the loosely agglomerated mass. In some approaches, the added sugar may be granulated sugar. The amount of added sugar may be adjusted based on, for example, the sweetness and/or calorie content of other components of the food composition, the target taste profile, and/or nutritional targets.

Oil is also included in the binder component, and comprises no more than about 15% by weight of the loosely agglomerated mass, and in some approaches no more than about 13% by weight of the loosely agglomerated mass. Any edible, plant-derived oil may be used. Preferably, the oil is canola oil. Flavored oils and oil extracts may also be used, depending on the desired taste profile.

A leavening agent, such as, for example, sodium bicarbonate, calcium bicarbonate, ammonium bicarbonate, baking powder, and/or mixtures thereof may also be included. In some approaches, the leavening agent may be included in the loosely agglomerated mass in amount of no more than 3%, and in some approaches no more than about 2% by weight of the loosely agglomerated mass. Additional seasonings, spices, and salts may also be added at any point during processing, as desired.

In embodiments where a low amount of starch may be added, the starch may be any suitable modified starch derived from any suitable starch source, such as corn, wheat, potato, tapioca, maize, sago, rice, and the like. In one approach, the starch may be derived from waxy starches, such as waxy corn, waxy maize, waxy rice, and waxy sorghum. Preferably the starch is a pre-gelatinized waxy corn starch. Added starch may be included in an amount less than 1% by weight of the loosely agglomerated mass.

Generally, dry ingredients comprising the inclusion component, the shredded component, sugar, and flour are combined in a mixer and mixed to form a first (dry) mixture. One or more leavening agents and any optional seasoning may also be included to form the first (dry) mixture. The dry ingredients are mixed for a time and at a mixing speed that adequately mixes the ingredients while maintaining the structural integrity of the expanded inclusions. It is important that the mixing process uses equipment and mixing speeds that are effective to maintain the structural integrity of the expanded inclusions so as to not crush or macerate the expanded inclusions. As discussed above, the air cells of the expanded inclusions are responsible, in part, for the unique loose, crunchy texture and multi-textural chew of the food composition. In one non-limiting example, the dry competent may be mixed for about 2 minutes at about 20 rpm.

Once the dry ingredients are adequately mixed to form the first mixture, the first mixture is combined with oil and water to form the loosely agglomerated mass. In some approaches, the oil is added to the first mixture and mixed to form a second mixture for a time and at a mixing speed effective to adequately mix the oil with the first ingredients while maintaining the structural integrity of the expanded inclusions. In one non-limiting example, the oil may be mixed with the first mixture for about 5 minutes at about 30 rpm. The water may then be added to the second mixture and mixed for a time and at a mixing speed effective to adequately mix the water with the second mixture while maintaining the structural integrity of the expanded inclusions, forming the loosely agglomerated mass. In one non-limiting example, the water may be mixed with the second mixture for about 3 minutes at about 30 rpm. In some approaches, the cohesiveness of the loosely agglomerated mass may be increased by increasing the temperature of the mixing to, for example, about 100° F.

In some approaches, loosely agglomerated mass has a moisture content of about 25% or less by weight of the loosely agglomerated mass. In some approaches, the loosely agglomerated mass may have a density of from about 0.45 g/cc to about 0.65 g/cc, and in some approaches a density of from about 0.5 g/cc to about 0.6 g/cc.

Following mixing, the loosely agglomerate mass may formed into various shapes and sizes using any shaping and/or sizing method that substantially maintains the integrity of the air cells in the expanded inclusions and does not crush or macerate the expanded inclusions during forming. For example, in some approaches, a rotary depositing process may be used to shape portions of the loosely agglomerated mass. In other approaches, known bar/sheeting processes may be used to shape portions of the loosely agglomerated mass. Notably, the inventors found that shaping using rotary molding resulted in a product that was too dense, with an undesirable, hard texture.

The pieces of the shaped agglomerated mass may have any shape. For example, in some approaches, they may be shaped to form a rectangle, square, triangle, and the like, which may be achieved using a bar/sheeting process. The pieces of the shaped agglomerated may also have a bar shape, having a length that is greater than a thickness of the bar and greater than a width of the bar. In other approaches, the pieces of the shaped agglomerated may have shapes such as a round or oval shape, or an irregular shape, which may be achieved using a rotary deposit process. The shaped agglomerated mass that is formed after the shaping process generally has a density of less than about 0.90 g/cc, and in some approaches a density of from about 0.7 g/cc to about 0.9 g/cc.

During the shaping process, in some approaches, it may be desirable to control the amount of compaction applied to the composition to form the shaped agglomerated mass having the desired density and retention of the integrity of the inclusions such that they are visible in the food composition. For instance, some processes, such as but not limited to, bar forming and rotary depositing, have been found to deliver the desired density while also maintaining integrity of inclusions. Conventional rotary molding processes are currently believed to apply higher compaction during forming and extraction from the mold. On the other hand, it is believed that rotary depositing, which typically uses a gentler filling of the mold cavity and a positive displacement from the mold, can deliver less overall compaction on the mass during forming and extraction from the mold. Similarly, bar processes can deliver gentler compression forces on the sheet during forming. Other processes that can deliver the desired density while also maintaining visible inclusions may also be employed.

After shaping, the pieces of shaped agglomerated mass are baked for a time and at a temperature sufficient to obtain a moisture content of no more than about 4%, and in some approaches nor more than about 3% by weight of the food composition. The baked food composition has a density of no more than about 0.80 g/cc, in some approaches a density of no more than about 0.70 g/cc, in some approaches a density of no more than about 0.60 g/cc, in some approaches a density of from about 0.30 g/cc to about 0.80 g/cc, in some approaches a density of from about 0.4 g/cc to about 0.70 g/cc, in some approaches a density of about 0.60 g/cc to about 0.80 g/cc, and in some approaches a density of from about 0.5 g/cc to about 0.70 g/cc. In one non-limiting example, the pieces of the shaped agglomerated mass may be baked at temperatures in the range of about 200° F. to about 425° F. for up to about an hour to achieve a suitable moisture content and density as described above. The final food composition may comprise any thickness, although the preferred thickness of the composition is about 8 mm to about 12 mm. In some approaches, the thickness to width ratio of the food composition is about 1:2 to about 1:4.

After baking, the food composition may have a Brabender particle size distribution of about 5% or less, in some approaches about 4% or less, in some approaches about 3% or less, and in some approaches about 2% or less by weight on a 4 mm (5 mesh) U.S. Standard Sieve; about 30% or less, in some approaches about 25% or less, in some approaches about 20% or less, in some approaches about 10% to about 30%, in some approaches about 15% to about 25%, and in some approaches about 16% to about 22% by weight on a 2.36 mm (8 mesh) U.S. Standard Sieve; at least about 25%, in some approaches at least about 30%, in some approaches at least about 35%, in some approaches about 25% to about 50%, and in some approaches about 30% to about 45% by weight on a 1.4 mm (12 mesh) U.S. Standard Sieve; at least about 20%, in some approaches at least about 25%, in some approaches about 20% to about 30%, and in some approaches about 22% to about 29% by weight on a 0.85 mm (20 mesh) U.S. Standard Sieve; and about 25% or less, and in some approaches about 10% to about 25% by weight through a 0.85 mm (20 mesh) U.S. Standard Sieve.

In some approaches, the food composition after baking may have a Brabender particle size distribution of about 5% or less by weight on a 4 mm (5 mesh) U.S. Standard Sieve, about 30% or less by weight on a 2.36 mm (8 mesh) U.S. Standard Sieve, at least about 25% by weight on a 1.4 mm (12 mesh) U.S. Standard Sieve, at least about 200 by weight on a 0.85 mm (20 mesh) U.S. Standard Sieve, and about 25% or less by weight through a 0.85 mm (20 mesh) U.S. Standard Sieve.

In some approaches, the food composition after baking may have a Brabender particle size distribution such that at most about 5%, in some approaches at most about 4%, in some approaches at most about 3%, and in some approaches at most about 2% by weight of the particles are greater than 4 mm; at most about 30%, in some approaches at most about 25%, in some approaches at most about 20%, in some approaches about 10% to about 30%, in some approaches about 15% to about 25%, and in some approaches about 16% to about 22% by weight of the particles are greater than 2.36 mm but less than or equal to 4 mm; at least about 25%, in some approaches at least about 30%0, in some approaches at least about 35%, in some approaches about 25% to about 50%, and in some approaches about 30% to about 45% by weight of the particles are greater than 1.4 mm but less than or equal to 2.36 mm; at least about 20%, in some approaches at least about 25%, in some approaches about 20% to about 30%, and in some approaches about 22% to about 29% by weight of the particles are greater than 0.85 mm but less than or equal to 1.4 mm; and at most about 25%, and in some approaches about 10% to about 25% by weight of the particles are less than or equal to 0.85 mm.

In some approaches, the food composition after baking may have a Brabender particle size distribution such that at most about 5% by weight of the particles are greater than 4 mm, at most about 30% by weight of the particles are greater than 2.36 mm but less than or equal to 4 mm, at least about 25% by weight of the particles are greater 1.4 mm but less than or equal to 2.36 mm, at least about 20% by weight of the particles are greater than 0.85 mm but less than or equal to 1.4 mm, and at most about 25% by weight of the particles are less than or equal to 0.85 mm.

The baked food composition may have a total porosity of at least about 30%, in some approaches at least about 35%, in some approaches at least about 40%, in some approaches about 30% to about 60%, in some approaches about 35% to about 50%, and in some approaches about 40% to about 45% by area of the food composition. The food composition may have a closed porosity of about 25% or less, in some approaches about 20% or less, in some approaches about 5% to about 25%, and in some approaches about 5% to about 20% by area of the food composition.

Generally, at least a portion of the shreds from the shredded component and at least a portion of the expanded inclusions are visible on the surface of the food composition. For example, defined shapes of shreds and expanded inclusions may be visible on the surface as well as within the food composition when the food composition is cut or broken in half. Thus, as discussed above, it is important that the integrity of at least a portion of the expanded inclusions and shreds are maintained during processing.

In some approaches, a flowable edible material, such as, for example, melted chocolate or a flowable mixture containing chocolate, may be applied to an outer surface of the food composition. For example, the edible material may be drizzled onto a top outer surface of the bar. In other approaches, the edible material may be applied to substantially coat the upper and/or bottom outer surfaces of the bar. In some approaches, the bar may be partially or even completely enrobed by the edible material. The flowable edible material may be, for example, chocolate-based, fruit-based, caramel-based, and/or the like. The flowable edible material is not limited to sweet materials, and may also include savory materials. In some approaches, one or more toppings may be applied following application of the flowable edible material. Suitable toppings may include, for example, one or more grains, legumes, seeds, vegetables, fruits, nuts, herbs, or any other edible particulate matter.

Advantages and embodiments of the baked food compositions described herein are further illustrated by the following examples; however, the particular conditions, processing schemes, materials, and amounts thereof recited in these examples, as well as other conditions and details, should not be construed to unduly limit the food compositions and methods described herein. All percentages are by weight unless otherwise indicated.

Example 2—Preparation of Snack Food Bar

In Example 2, a baked snack bar was prepared using the components listed in Table 4.

TABLE 4

Exemplary Formulation (Formulation 1)

| INGREDIENTS | % OF DOUGH |
|---|---|
| GROUP 1 | |
| Wheat flour | 15-25% |
| Sugar | 8-12% |
| Brown rice crisps | 2-5% |
| Millet, puffed | 2-5% |
| Shredded coconut | 5-10% |
| Shredded sweet potato, dehydrated | 18-25% |
| Baking powder | 1-3% |
| Seasonings | 2-5% |

TABLE 4-continued

Exemplary Formulation (Formulation 1)

| INGREDIENTS | % OF DOUGH |
|---|---|
| GROUP 2 | |
| Oil | 10-15% |
| GROUP 3 | |
| Water | 15-20% |

In Example 2, the group 1 ingredients listed in Table 4 were mixed at 20 rpm for 2 minutes. The oil (group 2) was combined with the dry mixture and mixed at 30 rpm for 5 minutes. The water (group 3) was added, and the mixture was mixed at 30 rpm for 3 minutes. The resulting loosely agglomerated mass had a moisture content of 21-23% (TBC). Bars were formed from the loosely agglomerated mass by a slitting/cutting process to form bars having the dimensions of 9.25 mm×19 mm×38 mm. The formed, pre-baked bars had a density of 0.70-0.90 g/cm$^3$. The bars were baked in a Hobart oven at 325° F. for 7 minutes on an open mesh band at 200° F. for 45 minutes to a moisture content of less than 3%. The final baked bars had the dimensions of 10.25 mm×20.5 mm×39.5 mm.

Example 3—Preparation of Snack Food Bar

In Example 3, a baked snack bar was prepared using the components listed in Table 5.

TABLE 5

Exemplary Formulation (Formulation 2)

| INGREDIENTS | % OF DOUGH |
|---|---|
| GROUP 1 | |
| Wheat flour | 15-25% |
| Sugar | 10-15% |
| Brown rice crisps | 5-10% |
| Puffed amaranth | 1-5% |
| Shredded coconut | 10-15% |
| Shredded sweet potato, dehydrated | 15-20% |
| Baking powder | 1-2% |
| Seasonings | 1-5% |
| GROUP 2 | |
| Oil | 10-15% |
| GROUP 3 | |
| Water | 15-20% |

In Example 3, the group 1 ingredients listed in Table 5 were mixed at 20 rpm for 2 minutes. The oil (group 2) was combined with the dry mixture and mixed at 30 rpm for 5 minutes. The water (group 3) was added, and the mixture was mixed at 30 rpm for 3 minutes. The resulting loosely agglomerated mass had a moisture content of 21-23% (TBC). Bars were formed from the loosely agglomerated mass by a slitting/cutting process to form bars having the dimensions of 9.25 mm×19 mm×38 mm. The formed, pre-baked bars had a density of 0.70-0.90 g/cm$^3$. The bars were baked in a Hobart oven at 325° F. for 7 minutes on an open mesh band at 200° F. for 45 minutes to a moisture content of less than 3%. The final baked bars had the dimensions of 10.25 mm×20.5 mm×39.5 mm.

Example 4—Preparation of Snack Food Bar

In Example 4, a baked snack bar was prepared using the components listed in Table 6.

TABLE 6

Exemplary Formulation (Formulation 3)

| INGREDIENTS | % OF DOUGH |
|---|---|
| GROUP 1 | |
| Wheat flour | 15-25% |
| Sugar | 5-10% |
| Brown rice crisps | 5-10% |
| Shredded coconut | 5-10% |
| Shredded sweet potato, dehydrated | 18-25% |
| Chia seeds | 1-5% |
| Dried tomato granules | 1-5% |
| Baking powder | 1-3% |
| Seasonings | 3-8% |
| GROUP 2 | |
| Oil | 10-15% |
| GROUP 3 | |
| Water | 15-20% |

In Example 4, the group 1 ingredients listed in Table 6 were mixed at 20 rpm for 2 minutes. The oil (group 2) was combined with the dry mixture and mixed at 30 rpm for 5 minutes. The water (group 3) was added, and the mixture was mixed at 30 rpm for 3 minutes. The resulting loosely agglomerated mass had a moisture content of 21-23% (TBC). Bars were formed from the loosely agglomerated mass by a slitting/cutting process to form bars having the dimensions of 9.25 mm×19 mm×38 mm. The formed, pre-baked bars had a density of 0.70-0.90 g/cm$^3$. The bars were baked in a Hobart oven at 325° F. for 7 minutes on an open mesh band at 200° F. for 45 minutes to a moisture content of less than 3%. The final baked bars had the dimensions of 10.25 mm×20.5 mm×39.5 mm.

Example 5—Preparation of Snack Food Bar

In Example 5, a baked snack bar was prepared using the components listed in Table 7.

TABLE 7

Exemplary Formulation (Formulation 4)

| INGREDIENTS | % OF DOUGH |
|---|---|
| GROUP 1 | |
| Wheat flour | 15-25% |
| Corn starch, pre-gelatinized | up to 1% |
| Sugar | 10-15% |
| Brown rice crisps | 5-10% |
| Puffed amaranth | up to 3% |
| Shredded coconut | 8-12% |
| Shredded sweet potato, dehydrated | 18-25% |
| Baking powder | 1-2% |
| Seasonings | 1-5% |
| GROUP 2 | |
| Oil | 12-16% |
| GROUP 3 | |
| Water | 15-20% |

In Example 5, the group 1 ingredients listed in Table 7 were mixed at 20 rpm for 2 minutes. The oil (group 2) was combined with the dry mixture and mixed at 30 rpm for 5 minutes. The water (group 3) was added, and the mixture was mixed at 30 rpm for 3 minutes. The resulting loosely agglomerated mass had a density of 0.5-0.6 g/cm$^3$. Bars were formed from the loosely agglomerated mass by a slitting/cutting process to form bars having the dimensions of 9.25 mm×19 mm×38 mm. The formed, pre-baked bars had a density of 0.70-0.90 g/cm³. The bars were baked in a Hobart oven at 325° F. for 7 minutes on an open mesh band at 200° F. for 45 minutes to a moisture content of less than 3%. The final baked bars had a density of 0.45-0.7 g/cm³.

Example 6—Bulk Density Analysis of Shredded Sweet Potato

In this example, bulk densities of the exemplary and comparative shredded sweet potato described in Example 1 were obtained and compared. As shown in Example 1, the comparative sweet potato shreds are generally thicker and wider on average than the exemplary sweet potato shreds.

To measure the bulk densities of both samples of shredded sweet potato, a plastic 2 liter cylinder was tared and then filled with shredded sweet potato dry product to past the 2 liter marker. A metal plate was slid into the cylinder to confirm the product was level within the cylinder and any excess material above the metal plate was removed. The metal plate was then removed and the whole plastic container containing the leveled product was weighed. The dry weight of the solid was divided by the volume and is expressed in g/cm³. Since bulk density increases with compaction and tends to increase with depth, this process was repeated to measure for 1 liter of product. Table 8 illustrates that the thin, light, and flaky exemplary sweet potato shreds were less dense than the thicker comparative sweet potato shreds.

TABLE 8

Comparison of Shredded Sweet Potato Bulk Density

| | | g/cm³ |
|---|---|---|
| Exemplary Shredded | Ave | 0.2335 |
| Sweet Potato | Min | 0.21 |
| n = 30 | Max | 0.26 |
| | Std | 0.0113 |
| Comparative Shredded | Ave | 0.2987 |
| Sweet Potato | Min | 0.28 |
| n = 30 | Max | 0.32 |
| | Std | 0.0114 |

Example 7—Texture Analysis of Snack Food Products (Blade Test)

This example illustrates the how different shaping processes, and/or different types of shredded sweet potato, may affect the breaking force observed for snack food products as measured using a blade test. In this example, the snack food products shaped using a bar process were compared to a snack food product shaped using a rotary molding process. Five groups of snack food test samples were prepared. Three groups of samples were prepared using the three formulations described in Examples 2 to 4, and using the thin, light, and flaky exemplary shredded sweet potato, as described in Examples 1 and 6. These three groups of samples (F3_ExSP_Bar, F2_ExSP, Bar F1_ExSP_Bar) were shaped using a bar process. A fourth group of samples (F3_CompSP_Bar) was prepared using the formulation described in Example 4 but using the thicker comparative shredded sweet potato, as described in Examples 1 and 6. This group of samples was also shaped using a bar process. A fifth group of samples (F3_ExSP_RM) was prepared using the formulation described in Example 4 and using the exemplary shredded sweet potato. This group of samples was shaped into a bar shape using a rotary molding process. The samples tested are listed below in Table 9.

TABLE 9

Samples Tested Using Blade Test

| Sample ID | Formulation No. | Shredded Sweet Potato | Shaping Process |
|---|---|---|---|
| F3_ExSP_RM | 3 | Exemplary | Rotary Molding |
| F3_CompSP_Bar | 3 | Comparative | Bar Process |
| F3_ExSP_Bar | 3 | Exemplary | Bar Process |
| F2_ExSP_Bar | 2 | Exemplary | Bar Process |
| F1_ExSP_Bar | 1 | Exemplary | Bar Process |

The blade test was carried out on samples in all five sample groups by using a texture analyzer, TA.XT Plus (Texture Technologies Corp.), with blade geometry (Part Number: TA-45) and load cell 25 Kg at ambient conditions. Exponent (software) was used for the test and data analysis. Prior to the measurement, the force was calibrated with a 5 Kg weight and the height was calibrated by zeroing the gap between the blade and the support plate. For a typical test, a snack bar was placed on the support plate and was aligned to ensure that the blade would break the bar at the center of the bar. The pre- and post-test speeds were both set to be 10 minis, and the test speed was 1 mm/s; in addition, the trigger force was 20 g and the test strain (depth) was 70% of the sample thickness. The maximum force during the blade method was recorded and 10 replicas have been tested to obtain the average and standard deviation. The results of the blade test are illustrated in FIG. 2.

Figure 2:
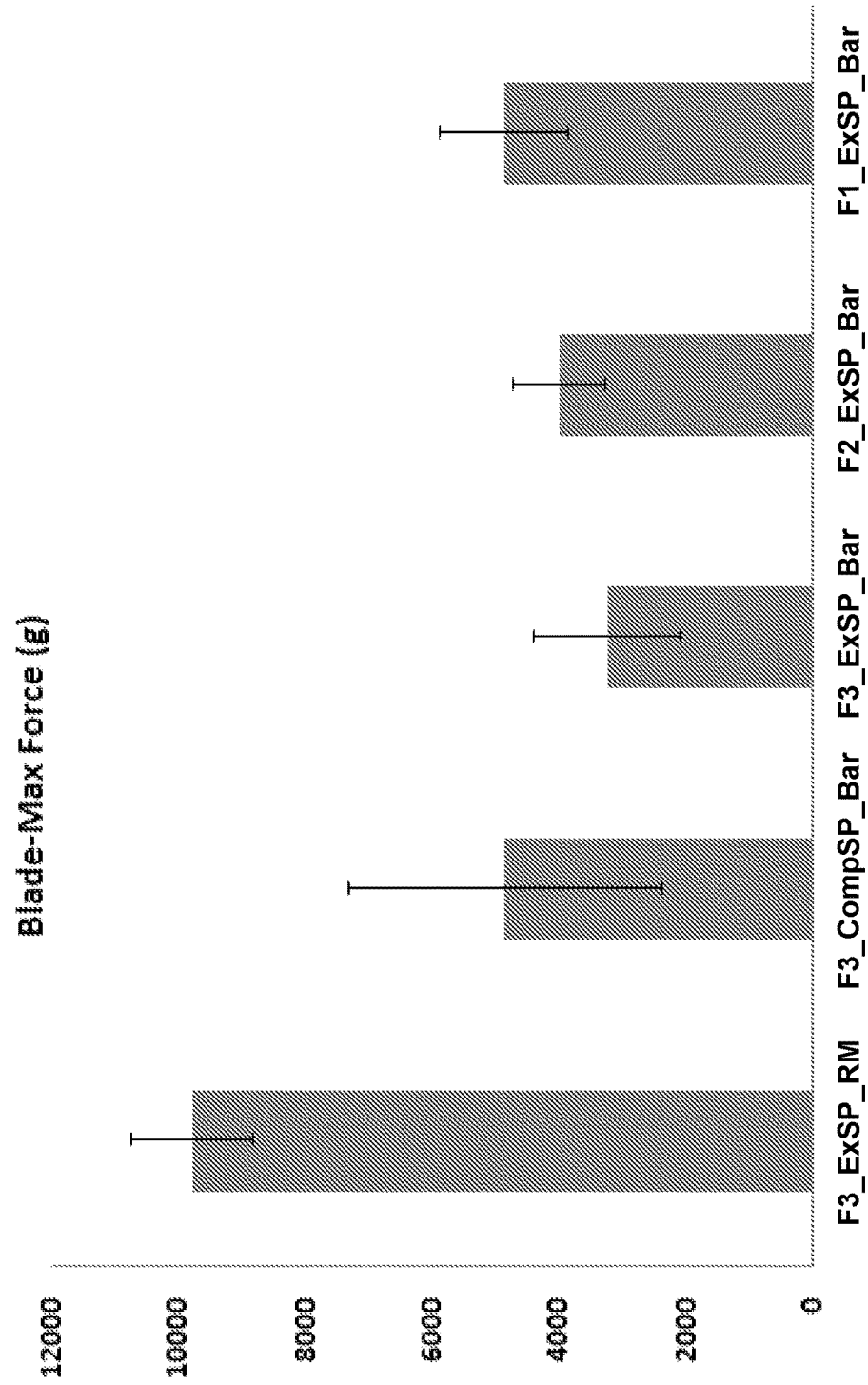
FIG. 2 illustrates results of a blade test texture analysis of exemplary and comparative snack food products.

As shown in FIG. 2, the F3_ExSP_RM sample, which was shaped using rotary molding, required the highest force to break the sample, and required significantly more force to break than the samples shaped using a bar process. FIG. 2 also shows that similar break forces were generally required for the F3_ExSP_Bar, F2_ExSP_Bar, and F1_ExSP_Bar samples, which have different formulations but were all shaped using a bar process. While not wishing to be limited by theory, it is believed that bars shaped using a lower compaction shaping process, such as, for example, a bar process, experience less pressure during processing than bars shaped by higher compaction shaping processes, such as, for example, rotary molding, thereby forming a product that requires significantly less force to break. The lower pressure exerted on the bars shaped using a bar process compared to rotary molding contributes to the unique loose, crunchy texture and multi-textural chew of the bar by minimizing crushing and/or mastication of the inclusions, especially low density inclusions, during shaping.

FIG. 2 also shows that the F3_CompSP_Bar sample, which included the thick, dense comparative shredded sweet potato, showed much higher variability in break force compared to the F3_ExSP_Bar, F2_ExSP_Bar, and F1_ExSP_Bar samples, which included the thin, light, and flaky exemplary shredded sweet potato.

Example 8—Texture Analysis of Snack Food Products (Brabender Test)

This example illustrates the how different shaping processes, and/or different types of shredded sweet potato, may affect the Brabender particle size distribution of snack food products. In this example, using a Brabender test, snack food products shaped using a bar process were analyzed and compared to a snack food product shaped using a rotary molding process test. Five groups of snack food test samples were prepared as in Example 7 and Table 9 above.

Two steps are included in the Brabender test: (i) sample breakage into powder; and (ii) particle size distribution (PSD) analysis of the powder. The snack bar was mechanically masticated in a Three Piece Mixer (120 ml) with two cam blades (C.W. Brabender Instrument Inc.). A 40 gram snack bar was loaded in the mixer and masticated at 50 rpm for 5 min. The sample was masticated under dry conditions and at ambient atmosphere. The powder after mechanical mastication was collected for further particle size distribution analysis using the sieves (U.S.A. Standard Testing Sieve, ASTME-11 Specification). For the snack bars, four different sieve sizes, 4 mm (5 mesh), 2.36 mm (8 mesh), 1.4 mm (12 mesh), and 0.85 mm (20 mesh), were used. The powder was first transferred to the 4 mm sieve and the sieve was shaken by hand to separate the particles. The leftover particles on the sieve were weighed. Those particles going through the 4 mm sieve was transfer to the 2.36 mm sieve, and the same procedure was performed, followed up with 1.4 mm and 0.85 mm sieves. Mass percent was employed as the result, where the mass percent was calculated using the mass of the particles from each sieve divided by the total mass of the powder. Two replicas were tested for each sample and the average and standard deviation were recorded. The results of the particle size distribution analysis are illustrated in Tables 10 and 11 and FIGS. 3 and 4.

Figure 3:
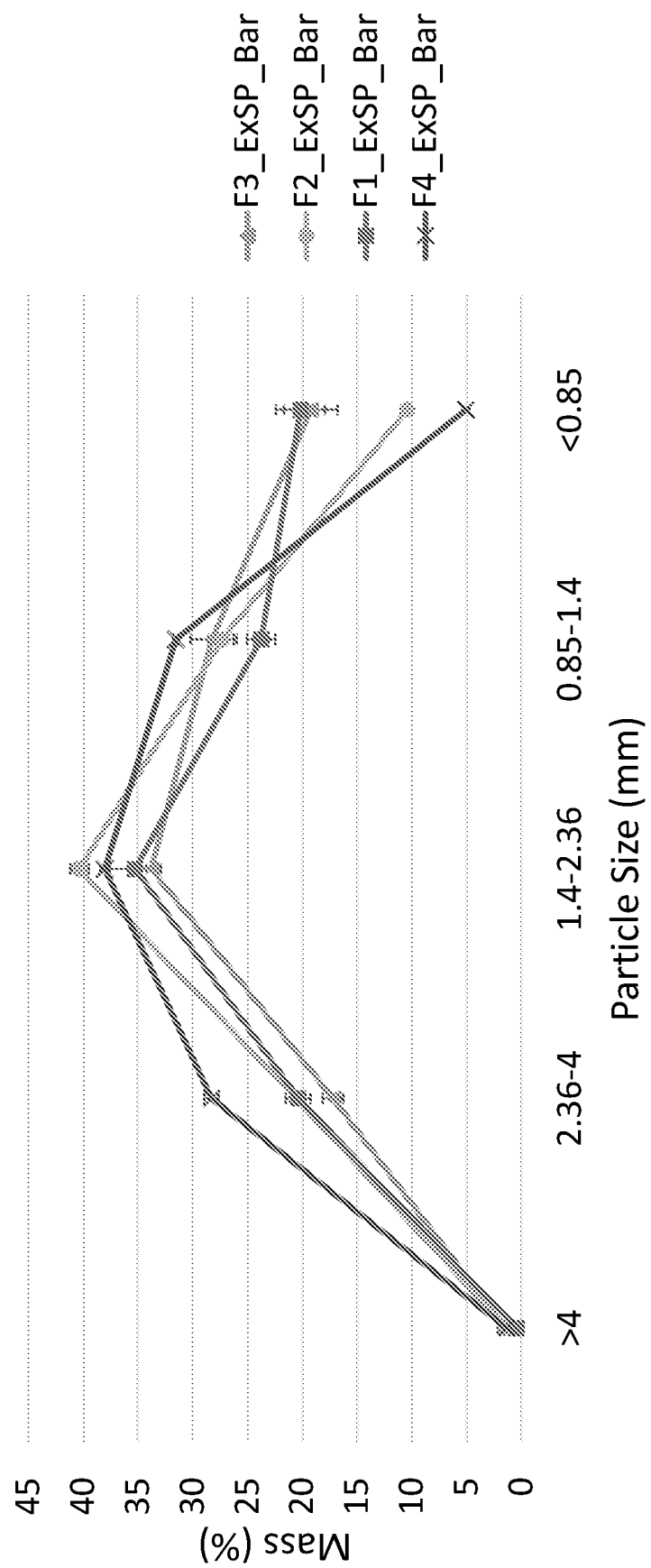
FIG. 3 illustrates results of a Brabender particle size distribution analysis of exemplary snack food products.

As shown in Table 10 and FIG. 3, samples F1_ExSP_Bar, F2_ExSP_Bar, F3_ExSP_Bar, and F4_ExSP_Bar, which have different formulations and were shaped using a bar process and contain the thin, light, and flaky exemplary shredded sweet potato, have similar particle size distributions after mastication.

TABLE 10

Particle Size Distributions for Various Formulations

| size(mm) | F2_ExSP_Bar ave(%) | stdev | F1_ExSP_Bar ave(%) | stdev |
|---|---|---|---|---|
| >4 | 1.35 | 0.61 | 0.42 | 0.07 |
| 2.36-4 | 20.54 | 0.56 | 20.37 | 1.14 |
| 1.4-2.36 | 40.36 | 0.84 | 35.27 | 2.33 |
| 0.85-1.4 | 27.31 | 1.29 | 23.76 | 1.29 |
| <0.85 | 10.45 | 0.50 | 20.17 | 2.25 |

| size(mm) | F3_ExSP_Bar ave(%) | stdev | F4_ExSP_Bar ave(%) | stdev |
|---|---|---|---|---|
| >4 | 1.53 | 0.07 | 1.35 | 0.80 |
| 2.36-4 | 17.19 | 0.95 | 28.30 | 0.67 |
| 1.4-2.36 | 33.80 | 0.43 | 38.05 | 0.40 |
| 0.85-1.4 | 28.25 | 1.99 | 31.55 | 0.25 |
| <0.85 | 19.23 | 2.44 | 5.05 | 0.33 |

Figure 4:
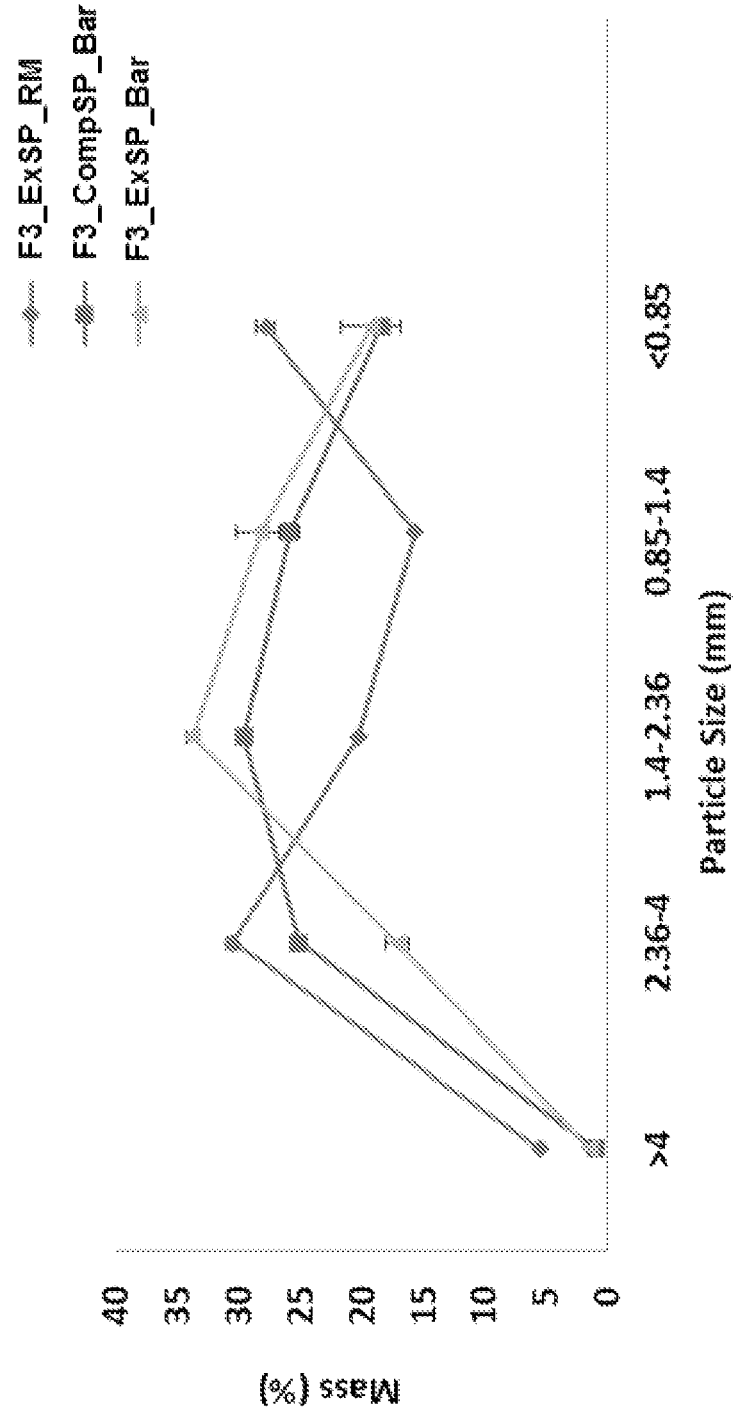
FIG. 4 illustrates results of a Brabender particle size distribution analysis of exemplary and comparative snack food products.

However, as shown in Table 11 and FIG. 4, the particle size distribution after mechanical mastication of the F3_ExSP_Bar sample shaped using a bar process is significantly different from the particle size distribution after mechanical mastication of the F3_ExSP_RM sample that was rotary molded, indicating that the product shaped using a lower compaction bar process breaks down differently from the product shaped using a higher compaction rotary molding process. For example, after mastication the F3_ExSP_Bar sample shaped using a bar process had more mid-sized particles of 0.85-1.4 mm and 1.4-2.36 mm than the F3_ExSP_RM sample, while the F3_ExSP_RM sample after mastication had more large-sized particles of 2.36-4 mm and more large-sized particles over 4 mm.

TABLE 11

Particle Size Distributions for Various Shaping Processes Shredded Sweet Potato

| size(mm) | F3_ExSP_RM ave (%) | st. dev | F3_CompSP_Bar ave(%) | stdev | F3_ExSP_Bar ave (%) | stdev |
|---|---|---|---|---|---|---|
| >4 | 5.51 | 0.18 | 0.95 | 0.01 | 1.53 | 0.07 |
| 2.36-4 | 30.55 | 0.40 | 25.14 | 0.43 | 17.19 | 0.95 |
| 1.4-2.36 | 20.33 | 0.04 | 29.59 | 0.74 | 33.80 | 0.43 |
| 0.85-1.4 | 15.76 | 0.22 | 25.88 | 0.80 | 28.25 | 1.99 |
| <0.85 | 27.85 | 0.76 | 18.43 | 0.13 | 19.23 | 2.44 |

Table 11 and FIG. 4 also illustrate differences in particle size distribution after mastication between the F3_ExSP_Bar sample made with thin, light, and flaky exemplary shredded sweet potato, and the F3_CompSP_Bar sample made with thicker, denser comparative shredded sweet potato. For example, after mastication the F3_ExSP_Bar sample using the exemplary shreds had more mid-sized particles of 0.85-2.36 mm, while the F3_CompSP_Bar sample made with the comparative shreds comprised more large-sized particles of 2.36-4 mm. While not wishing to be limited by theory, the higher amount of large-sized particles in the F3_CompSP_Bar sample compared to the F3_ExSP_Bar sample that used the exemplary shreds may be due, in part, to the higher bulk density and/or the greater thickness of the comparative sweet potato shreds in the F3_CompSP_Bar sample. It is believed that the thicker, denser sweet comparative potato shreds used in the F3_CompSP_Bar sample are less likely to break down to as fine of a particle as the thinner, lighter, and flakier exemplary sweet potato shreds used in the F3_ExSP_Bar, as explained further in Example 8.

Example 9—Texture Analysis of Shredded Sweet Potato (Brabender Test)

This example illustrates that different types of shredded sweet potato have significantly different particle size distributions. In this example, the thin, light, and flaky exemplary shredded sweet potato and the thicker, denser comparative shredded sweet potato, both of which were described in Examples 1 and 6, were analyzed using the Brabender test described in Example 8.

As explained in Example 8, two steps are included in the Brabender test: (i) sample breakage into powder; and (ii) particle size distribution (PSD) analysis of the powder. The shredded sweet potato was mechanically masticated in a Three Piece Mixer (120 ml) with two cam blades (C.W. Brabender Instrument Inc.). 40 grams of the shredded sweet potato was loaded in the mixer and masticated at 50 rpm for 5 min. The sample was masticated under dry conditions and at ambient atmosphere. The powder after mechanical mastication was collected for further particle size distribution analysis using the sieves (U.S.A. Standard Testing Sieve, ASTME-11 Specification). For the shredded sweet potato samples, three sieves (4, 2.36, and 1.4 mm) were used. The powder was first transferred to the 4 mm sieve and the sieve was shaken by hand to separate the particles. The leftover particles on the sieve were weighed. Those particles going through the 4 mm sieve was transfer to the 2.36 mm sieve, and the same procedure was performed, followed up with the 1.4 mm sieve. Mass percent was employed as the result, where the mass percent was calculated using the mass of the particles from each sieve divided by the total mass of the powder. Two replicas were tested for each sample and the average and standard deviation were recorded. The results of the particle size distribution analysis of the shredded sweet potato samples are illustrated in FIGS. 5 and 6.

Figure 5:
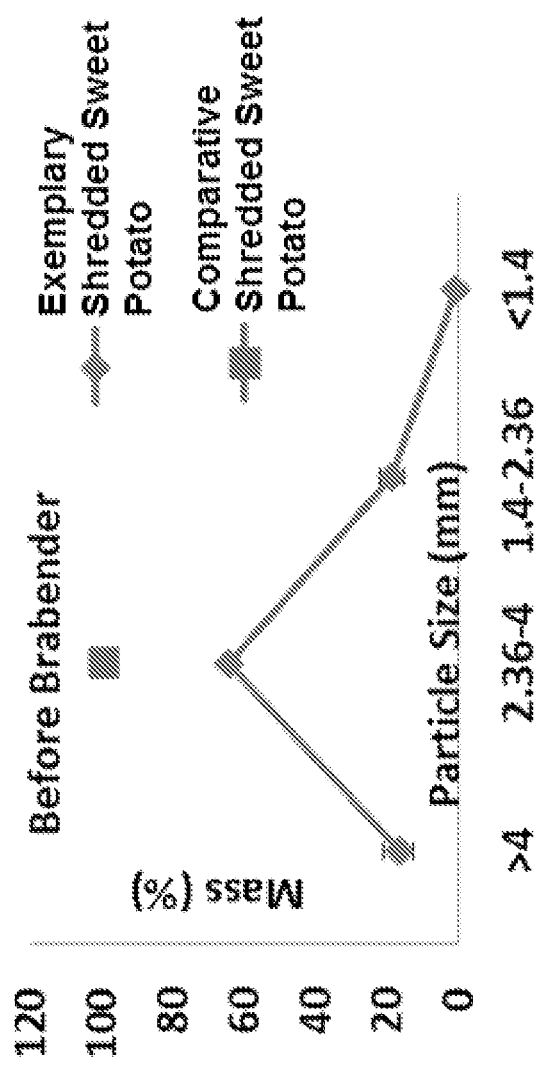
FIG. 5 illustrates particle size distributions of exemplary and comparative shredded sweet potato samples.
Figure 6:
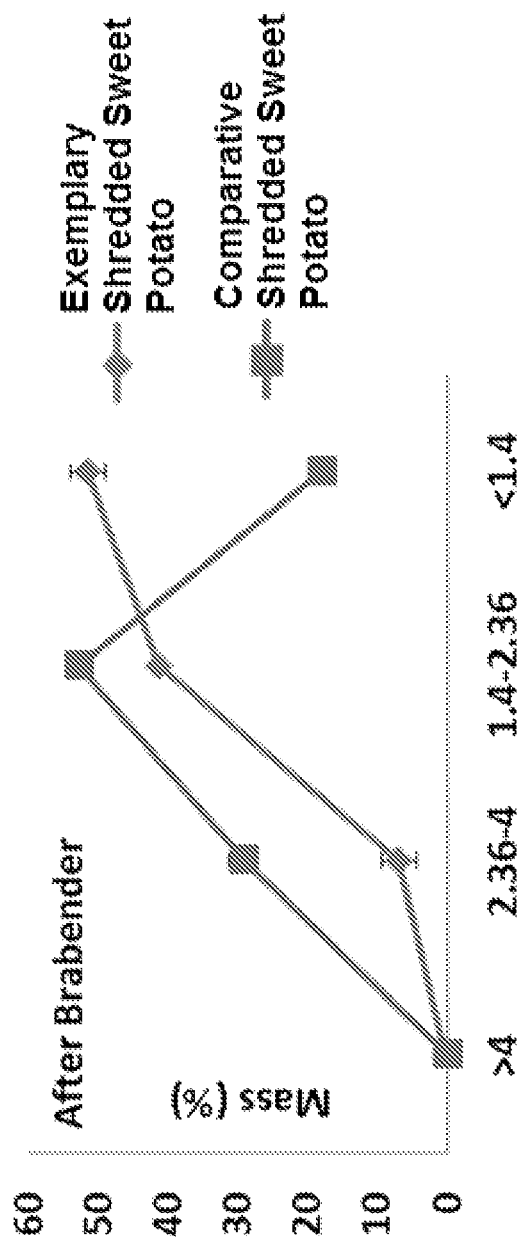
FIG. 6 illustrates results of a Brabender particle size distribution analysis of the exemplary and comparative samples of shredded sweet potato shown in FIG. 5.

As shown in FIG. 5, the particle size distributions of the exemplary and comparative sweet potato shreds before mastication differed significantly. The exemplary shreds before mastication had about 20% particles of 1.4-2.36 mm, about 60% particles of 2.36-4 mm, and about 20% particles greater than 4 mm. By contrast, the comparative shreds before mastication had 100% particles of 2.36-4 mm. As shown in FIG. 6, after mastication, the exemplary shreds comprised significantly more fine and small-sized particles than the comparative shreds, which contained more large-sized particles. FIG. 6 illustrates that after mastication, the exemplary shreds had over 50% fine particles of less than 1.4 mm, over 40% particles of 1.4-2.36 mm, and less than 10% particles of 2.36-4 mm, while the comparative shreds had less than 20% fine particles of less than 1.4 mm, over 50% particles of 1.4-2.36 mm, and about 30% particles of 2.36-4 mm.

Example 10—Density Analysis of Snack Food Products

This example illustrates how different shaping processes, and/or different types of shredded sweet potato, may affect the density of snack food products. In this example, the densities of snack food products shaped using rotary molding and shaped using a bar process were analyzed and compared using a Perten volume scanning instrument. Three groups of samples were prepared using formulation 3 as described in Example 4. Sample F3_ExSP_Bar included the thin, light, and flaky exemplary shredded sweet potato and was shaped using a bar process. Sample F3_CompSP_Bar included the thicker, denser comparative shredded sweet potato and was shaped using a bar process. Sample F3_ExSP_RM included the exemplary shredded sweet potato and was shaped using a rotary molding process. The samples tested are listed below in Table 12.

TABLE 12

Samples Tested for Density

| Sample ID | Formulation No. | Shredded Sweet Potato | Shaping Process |
|---|---|---|---|
| F3_ExSP_RM | 3 | Exemplary | Rotary Molding |
| F3_CompSP_Bar | 3 | Comparative | Bar Process |
| F3_ExSP_Bar | 3 | Exemplary | Bar Process |

The density of each product was calculated using weight and volume measurements of the whole bar. The volume of the bar was measured by Perten Instruments TexVol BVM-L190LC. The weight of the bar was measured using analytical balances, such as, for example, Mettler AE160 or a similar model. Ten different bars were used to determine the average density and standard deviation. Ten individual samples were used to determine the average density and standard deviation for each of the three snack food products tested. The results are presented in Table 13 below, and illustrated in FIG. 7.

TABLE 13

Density Analysis of Snack Food Products

| Sample ID | Average density, g/cm$^3$ | STD | % RSD |
|---|---|---|---|
| F3_ExSP_Bar | 0.554 | 0.031 | 5.593 |
| F3_CompSP_Bar | 0.597 | 0.036 | 6.068 |
| F3_ExSP_RM | 0.739 | 0.015 | 2.062 |

Figure 7:
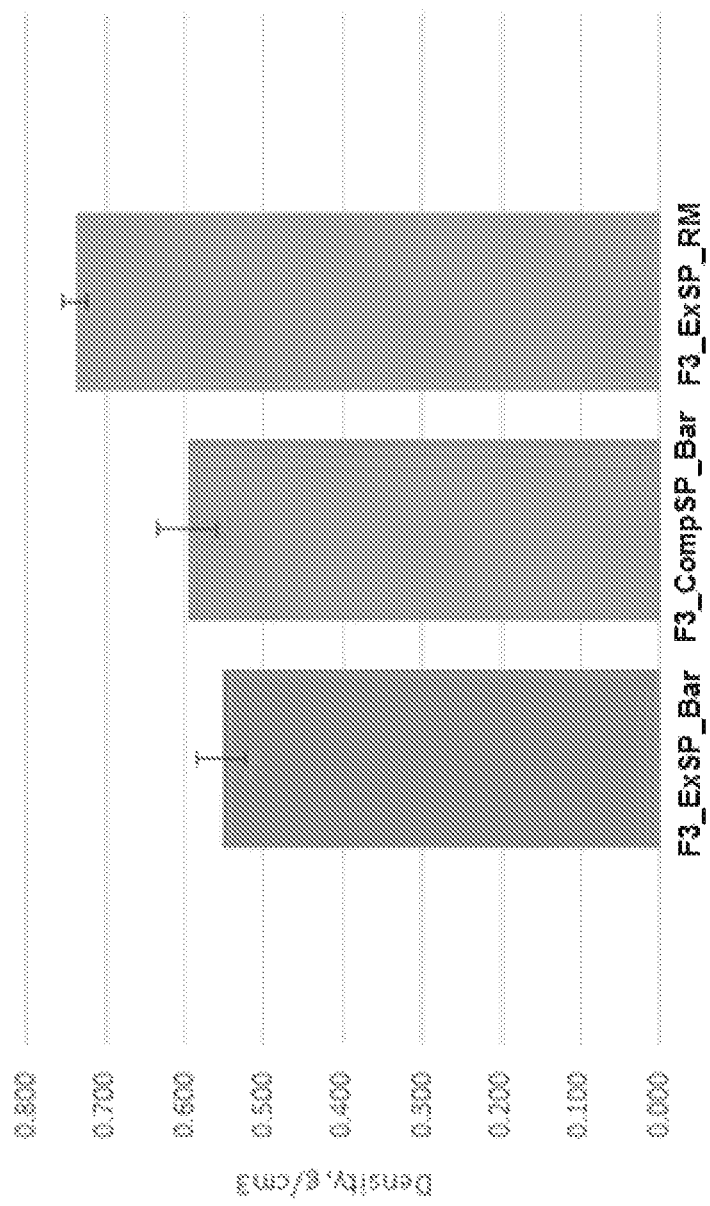
FIG. 7 illustrates results of a density analysis of exemplary and comparative snack food products.

As shown in Table 13 and FIG. 7, the two bars shaped using a bar process had average densities of below 0.600 g/cm$^3$, while the bar shaped using rotary molding had a significantly higher average density of 0.739 g/cm$^3$. While not wishing to be limited by theory, it is believed that bars shaped using a lower compaction shaping process, such as, for example, a bar process, experience less pressure during processing than bars shaped by higher compaction shaping processes, such as, for example, rotary molding, resulting in a significantly lower density of the final bar product. The lower pressure exerted on the bars shaped using a bar process compared to rotary molding contributes to the unique loose, crunchy texture and multi-textural chew of the bar by minimizing crushing and/or mastication of the inclusions, especially low density inclusions, during shaping.

Example 11—Quantitative Descriptive Analysis of Snack Food Products

This example illustrates how different shaping processes, and/or different types of shredded sweet potato, may affect various texture attributes of snack food products. In this example, Quantitative Descriptive Analysis was used to determine that there are statistically significantly differences in texture attributes between rotary molded snack food products and snack food products shaped using a bar process. Quantitative Descriptive Analysis was also used to determine that there are statistically significantly differences in texture attributes between snack food products containing the thin, light, and flaky exemplary shredded sweet potato described in Examples 1 and 6, and snack food products containing the thicker, denser comparative shredded sweet potato described in Examples 1 and 6.

Quantitative Descriptive Analysis (QDA) is a well-established, industry standard method of sensory evaluation. Sensory evaluation is defined as "a scientific discipline used to evoke, measure, analyze, and interpret reactions to those characteristics of foods and materials as they are perceived by the senses of sight, smell, taste, touch, and hearing" (Sensory Evaluation Practices, 3rd edition by Herbert Stone and Joel Sidel, p. 13).

A descriptive panel of 10-15 people trained in the Tragon QDA™ methodology is used to evaluate the sensory characteristics of products. The panelists are selected on the basis of their frequent use of products, sensory acuity, and descriptive ability. They develop a vocabulary to describe the aroma, appearance, handtouch, flavor, texture and aftertaste of samples through a series of moderated discussion sessions.

In a Language Development Session, panelists individually evaluate (taste, smell, feel, etc.) the product and generate terms to describe the product. The panel is specifically instructed to avoid quality judgements (such as like/dislike) when developing their terms. The group then discusses the terms generated, and through consensus develops a single ballot of terms and definitions.

It is important to note that the panel never has previous knowledge of the project, objectives, or product concept (i.e., name, formula, etc.).

The samples are evaluated by the panelists, individually, using the vocabulary they create on an unstructured line scale. The samples are presented blind and in a balanced design to minimize bias due to presentation order. Each panelist evaluates all products for all attributes three to four times (depending on number of samples within the set).

The data is collected using the web-based Compusense data collection system (Compusense at Hand, Canada) and analyzed with the Tragon QDA™ software. The unstructured line scale used for evaluation is electronically converted to a 100-point scale for analysis. Analysis of Variance (ANOVA) is applied to the data for each attribute, to determine if there are statistical differences among the samples.

Texture and mouthfeel attributes that were evaluated by the judging panel are listed in Table 14.

TABLE 14

Texture/Mouthfeel Attributes

| Attribute | Definition |
| --- | --- |
| INITIAL BITE HARDNESS (soft-hard) | The measure of how hard the cracker feels on initial bite, from soft to hard. |
| VOLUME OF SOUND (soft-loud) | The measure of the volume of crunchy and/or crispy sound made upon the initial bite of the sample with the front teeth. |
| FRACTURES (small-large) | The measure of how much the product fractures on initial bite of the biscuit. On the low end, the product will crumble into many, small pieces. On the high end, the product will snap into large shards. |
| DENSITY (airy-dense) | The measure of how airy/dense the sample is. On the low end of the scale, the samples will be loose and airy. On the high end of the scale, the samples will be dense and compacted. |
| CRUMBLY (slightly-very) | The measure of how crumbly the cracker is in the mouth as it breaks down on second or third chew. On the low end, the product will remain cohesive and not break apart easily. On the high end, the product will crumble into many small pieces. |
| AMOUNT OF PARTICLES (a little-a lot) | The measure of how many particles/pieces are in the product, from a little to a lot |
| HARDNESS OF PARTICLES (soft-hard) | The measure of how hard the particles/pieces are in the product, from soft to hard. |
| SIZE OF PARTICLES (small-large) | The measure of how large the particles/pieces are, from small to large. |
| DRYNESS (moist-dry) | The measure of how dry the sample is. On the low end, the sample will have some moisture to it. On the high end, the sample will be very dry. |
| CONGEALS (slightly-very) | The measure of how much the total product congeals into a ball. On the low end, the mass is spread around the mouth into many pieces (including loose particles); in the middle, a sample will form a loose mass/paste in the mouth, similar to a graham cracker; on the high end, the crackers clumps into a ball, like a bubble gum. |
| DISSOLVE RATE (slow-quick) | The measure of how quickly the cracker dissolves, or breaks down, as it's being chewed to the point of swallow, measured from slow to quick. |
| STICKS TO TEETH (slightly-very) | The measure of how much the cracker sticks to/in the teeth and/or in the mouth as its being chewed. |
| MOUTH DRYING (slightly-very) | The measure of how drying the cracker makes the mouth feel, like a drink of water is needed. |
| PASTY MOUTHCOATING (slightly-very) | The measure of how much of a pasty residue remains on the tongue or in the mouth, reminiscent of a floury coating. |
| OILY MOUTHCOATING (slightly-very) | The measure of how much of an oily residue remains on the tongue or in the mouth, reminiscent of a waxy or oily film. |

A listing of the samples that were evaluated by the judging panel using the method described above may be found in Table 15 below.

TABLE 15

Samples Tested Using Quantitative Descriptive Analysis

| Sample ID | Formulation No. | Shredded Sweet Potato | Shaping Process | Test Method |
| --- | --- | --- | --- | --- |
| D47 | 1 | Exemplary | Bar Process | QDA |
| M62 | 2 | Exemplary | Bar Process | QDA |
| S20 | 3 | Exemplary | Bar Process | QDA |
| R50 | 3 (no tomato) | Exemplary | Bar Process | QDA |
| A11 | 3 | Comparative | Bar Process | QDA |
| K30 | 3 | Exemplary | Rotary Molded | QDA |

Snack food sample D47 was prepared using the formulation described in Example 2, sample M62 was prepared using the formulation described in Example 3, and samples S20, R50, A11 and K30 were prepared using the formulation described in Example 4. Snack food samples D47, M62 S20, R50, and K30 included the thin, light, and flaky exemplary shredded sweet potato described in Examples 1 and 6, while sample A11 included the thicker, denser comparative shredded sweet potato described in Examples 1 and 6. Snack food samples D47, M62 S20, R50, and A11 were shaped using a bar process, while sample K30 was shaped using rotary molding. The results of the analyses of the above-described samples are illustrated in FIGS. 8-10.

Figure 8:
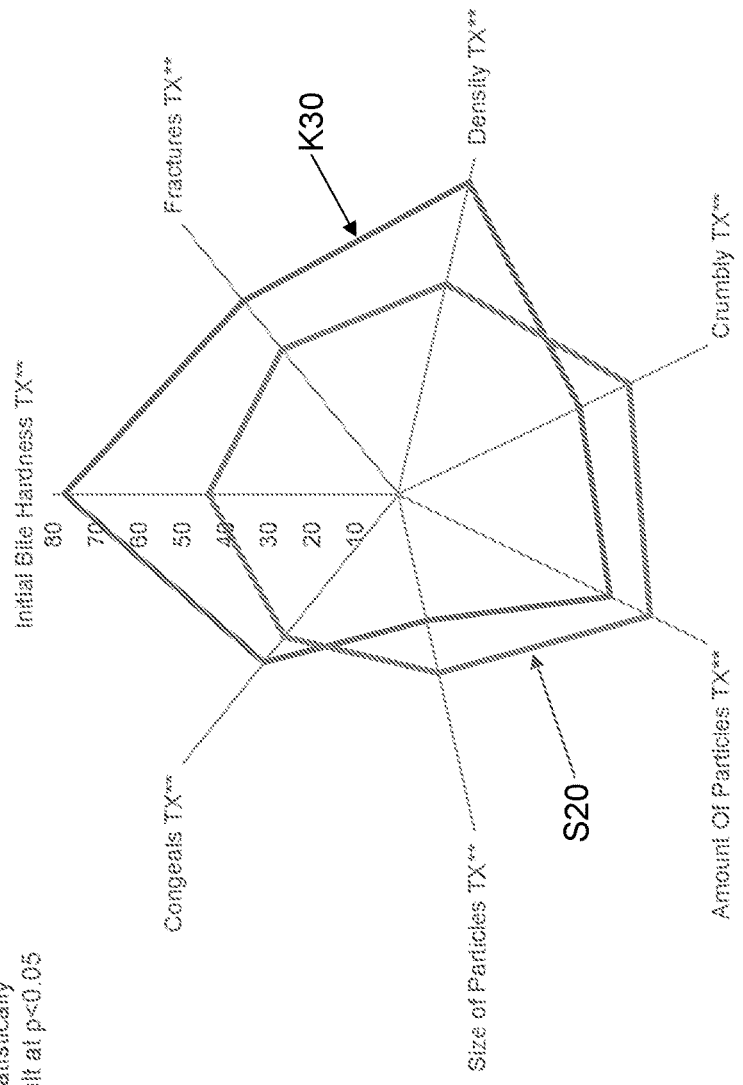
FIG. 8 illustrates results of a Quantitative Descriptive Analysis of exemplary and comparative snack food products.

As shown in FIG. 8, there are statistically significant differences (p<0.05) in some of the texture attributes tested between snack food products that are shaped by rotary molding and snack food products that are shaped by a bar process. FIG. 8 illustrates that compared to the rotary molded product (K30), the bar process product S20, which is similar to K30 except for not being rotary molded, is significantly less Hard, has less Fracturing, is less Dense, is more Crumbly, has more Particles, has larger Particles, and has less Congealing. The panel was able to clearly detect perceptible differences in these two processing techniques, further illustrating that a snack food product shaped using a bar process results in a product that is sensorally different from an otherwise similar snack food product that is shaped by rotary molding.

Figure 9:
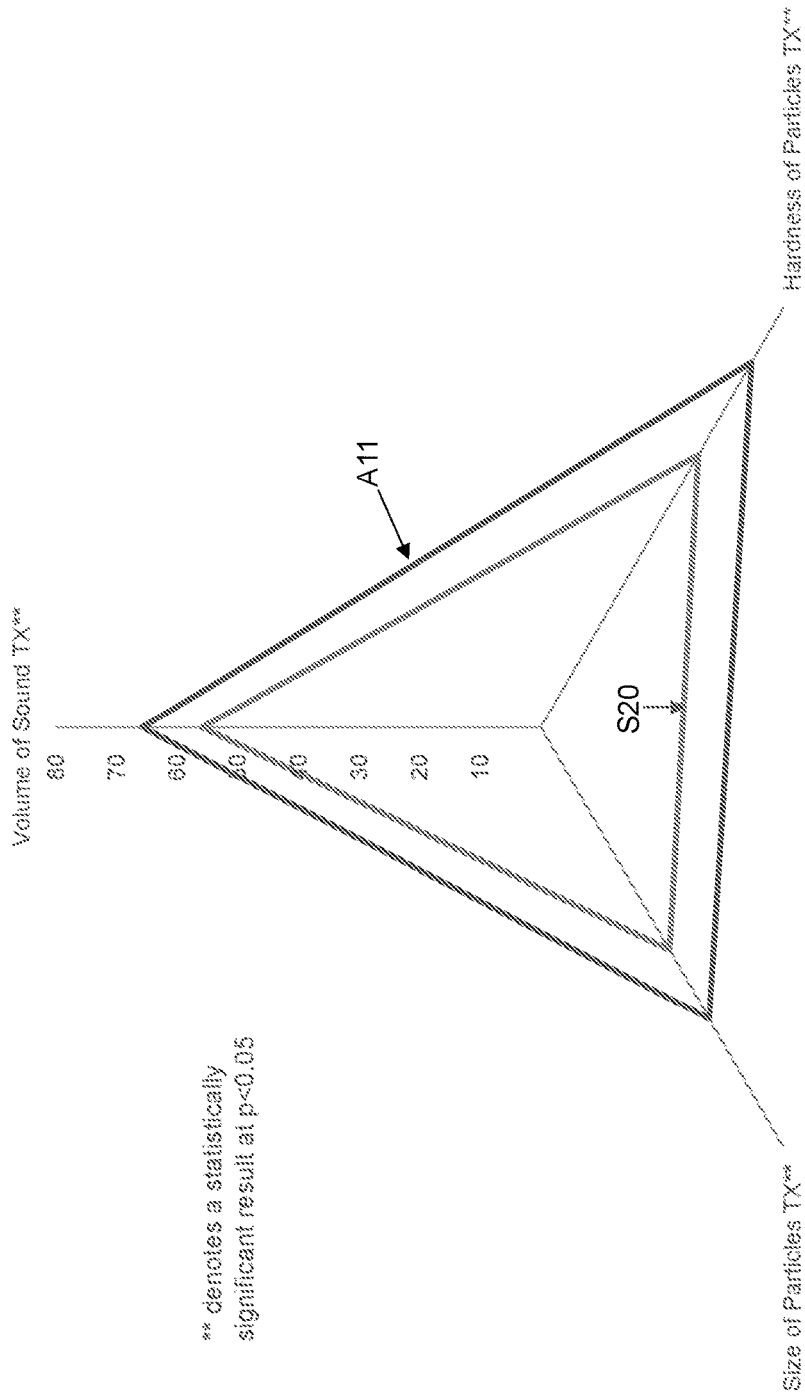
FIG. 9 illustrates results of a Quantitative Descriptive Analysis of exemplary and comparative snack food products.
Figure 10:
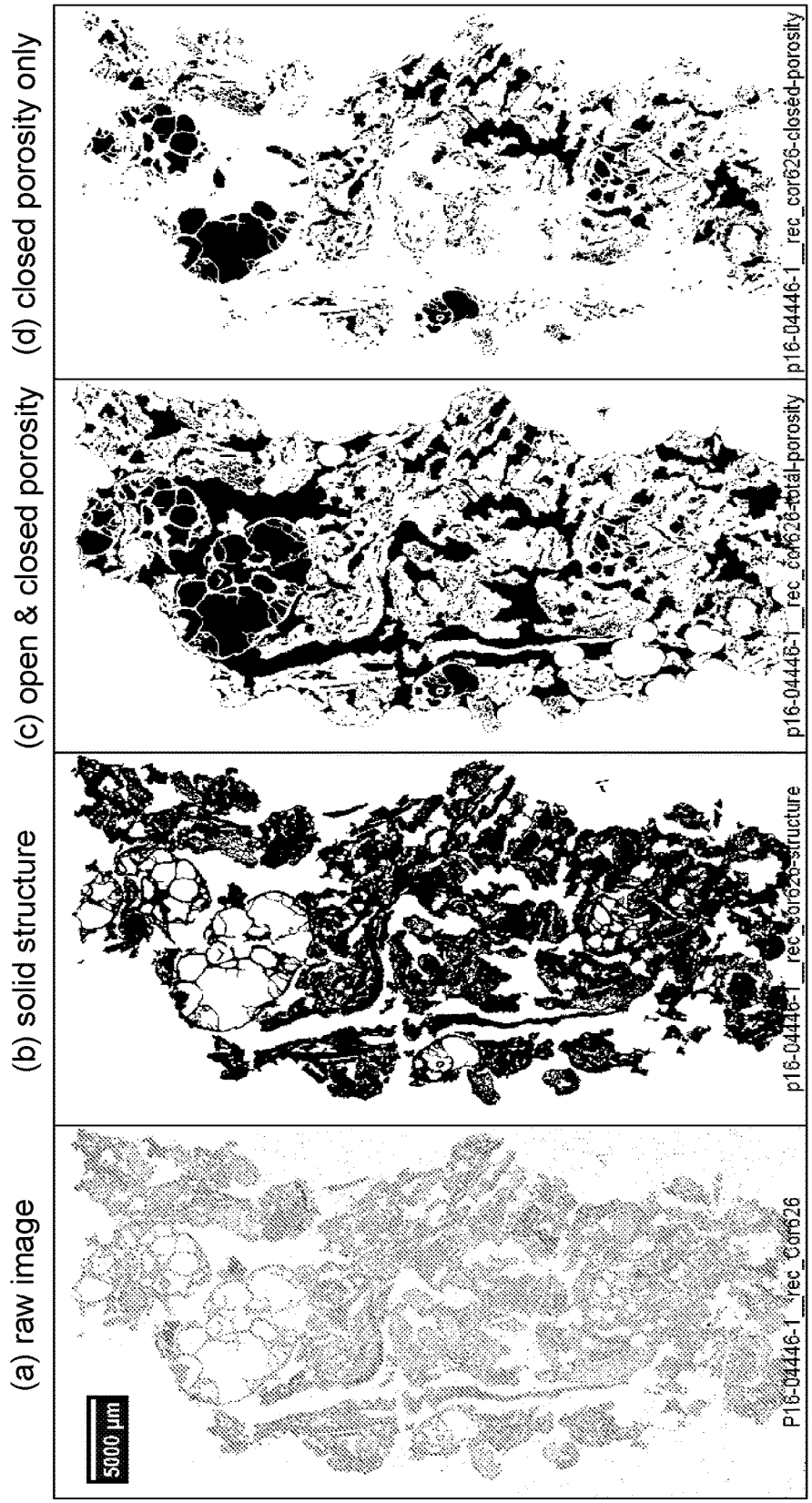
FIG. 10 illustrates four stages of x-ray tomography images saved during image processing.

As shown in FIG. 9, there are statistically significant differences (p<0.05) in some of the texture attributes tested between snack food products made with the thin, light, and flaky exemplary shredded sweet potato and snack food products made with the thicker, denser comparative shredded sweet potato. The snack food product using the exemplary shredded sweet potato (S20) is lower in Volume of Sound, less Hard in Particle Pieces, and smaller in Particle Pieces. The panel was able to clearly detect perceptible differences between the two shredded sweet potato products, further illustrating that a these ingredients create two sensorally different products.

Example 12—X-Ray Tomography of Snack Food Products

This example illustrates how different shaping processes may affect the porosity of snack food products. In this example, two similar savory snack food bar products—one of which was shaped using a bar process and one of which was shaped by rotary molding—were submitted to microscopy for structural analysis. The aim was to understand whether the product's microstructure was impacted by changing the shaping process from a bar process to a rotary molding process. This example illustrates a significant difference in porosity between snack food products shaped using a bar process and snack food products shaped by rotary molding.

Two snack food products were prepared using the formulation described in Example 4, with one product being shaped using a bar process the other sample being shaped by rotary molding. X-ray tomography was used to analyze the porosity of the snack food samples.

X-ray micro-tomography is a technique that can be employed to visualize and measure the microstructure of food materials in three dimensions (Imaging Technologies and Data Processing for Food Engineers, Chapter 6, 2016, edition 1, Editors: Sozer, Nesli, eBook ISBN 978-3-319-24735-9, Hardcover ISBN: 978-3-319-24733-5, DOI 10.1007/978-3-319-24735-9, Series ISSN 1571-0297.) The technique allows non-destructive measurements without a time consuming preparation method. An x-ray cone-beam illuminates the object and a planar x-ray camera collects the magnified projection images. Based on hundreds of angular views acquired while the object rotates, a radiographic image is generated. The reconstruction takes place using a Feldkamp algorithm (http://bruker-microct.com/products/nrecon.htm). A 3D-object visualization is obtained by addition of sequentially reconstructed slices.

The reconstructed grey scale image is converted into a binary image on the basis of intensity differences in the image (ranging from 0-255). This way, the different structures in the image can be separated from the background which consists of air. This step always needs to be applied before further image analysis can be carried out.

Objects in the volume of interest (formed around the scanned crunch bar) are identified via thresholding (i.e., air bubbles) and the volume of each object is calculated. On the basis of the volume value for each air bubble, the pore size radius is calculated. The volume distribution shows the proportional share of the total volume which is taken by different size classes.

| Samples and Methods of X-Ray Tomography Analysis | | |
|---|---|---|
| Sample ID | Sample Description | Image pixel size (run a, b, c) |
| P16-04446-1 | Formulation 3_Bar Process | 5.95 μm, 12.41 μm, 12.41 μm |
| P16-04446-4 | Formulation 3_Rotary Molded | 5.43 μm, 10.86 μm, 10.86 μm |

X-Ray Micro Tomography (μCT):

A complete snack food bar product from each sample variant was mounted upright onto a brass stub using polystyrene foam to hold the sample in place. The entire volume of each sample was scanned by μCT using an oversized scan. The image sets were reconstructed using NRecon, after which image analysis was carried out in CT Analyser to extract information on the aeration of the analysed volume. Three scans were acquired for each sample.

Instrument and Software Parameters:
Instrument: SkyScan 1172
Software: SkyScan172 version 1.5 (build 23), source type: 10 Mp Hamamatsu 100/250
Camera Resolution (pixel): 4000×2096, Camera Binning: 1×1 and 2×2 for high and medium resolution, respectively
Source voltage (kV): 55, source current (μA): 181, image pixel size (μm): sample dependent (see table), filter: Al 0.5 mm
Rotational step (deg.): 0.3° and 0.4° for high and medium resolution, respectively
NRecon version 1.6.9.18 (64-bit), Output Format: 8-bit BMP, Post Alignment: corrected
CT Analyser version 1.16.1.0+
Image Analysis:
For each sample, nine 2D slices of the 3D sample volume were selected for analysis of the aeration structure. For each direction (coronal, sagittal and transversal) three cross-sections were selected (e.g. through the center of the object, and left and right from the central axis). During the image processing procedure the solid material was separated from the background to enable the analysis of the porosity of the samples.

Image Processing Steps:
Thresholding [20, 255]
Remove white speckles (area less than 500 pixels for high resolution, area less than 250 pixels for medium resolution)
Opening (round kernel, radius 2 for high resolution, radius 1 for medium resolution)
Remove black speckles (area less than 250 pixels for high resolution, area less than 125 pixels for medium resolution)
Closing (round kernel, radius 5 for high resolution, radius 3 for medium resolution)
Remove white speckles (area less than 1000 pixels for high resolution, area less than 500 pixels for medium resolution)

ROI shrink-wrap (round kernel, stretch over holes with a diameter of 100 pixels)

Images were saved at different stages during the processing to produce the data for porosity analysis. As shown in FIG. 10, the four stages of images saved were (a) raw image; (b) solid structure; (c) open and closed porosity; and (d) closed porosity only.

Each sample had three replicate scans, each containing 9 slices, which were saved and analyzed as described. Therefore a total of 27 cross-sections were analyzed for each sample (P16-04446-1 Bar Process and P16-04446-4 Rotary Molded).

Figure 11:
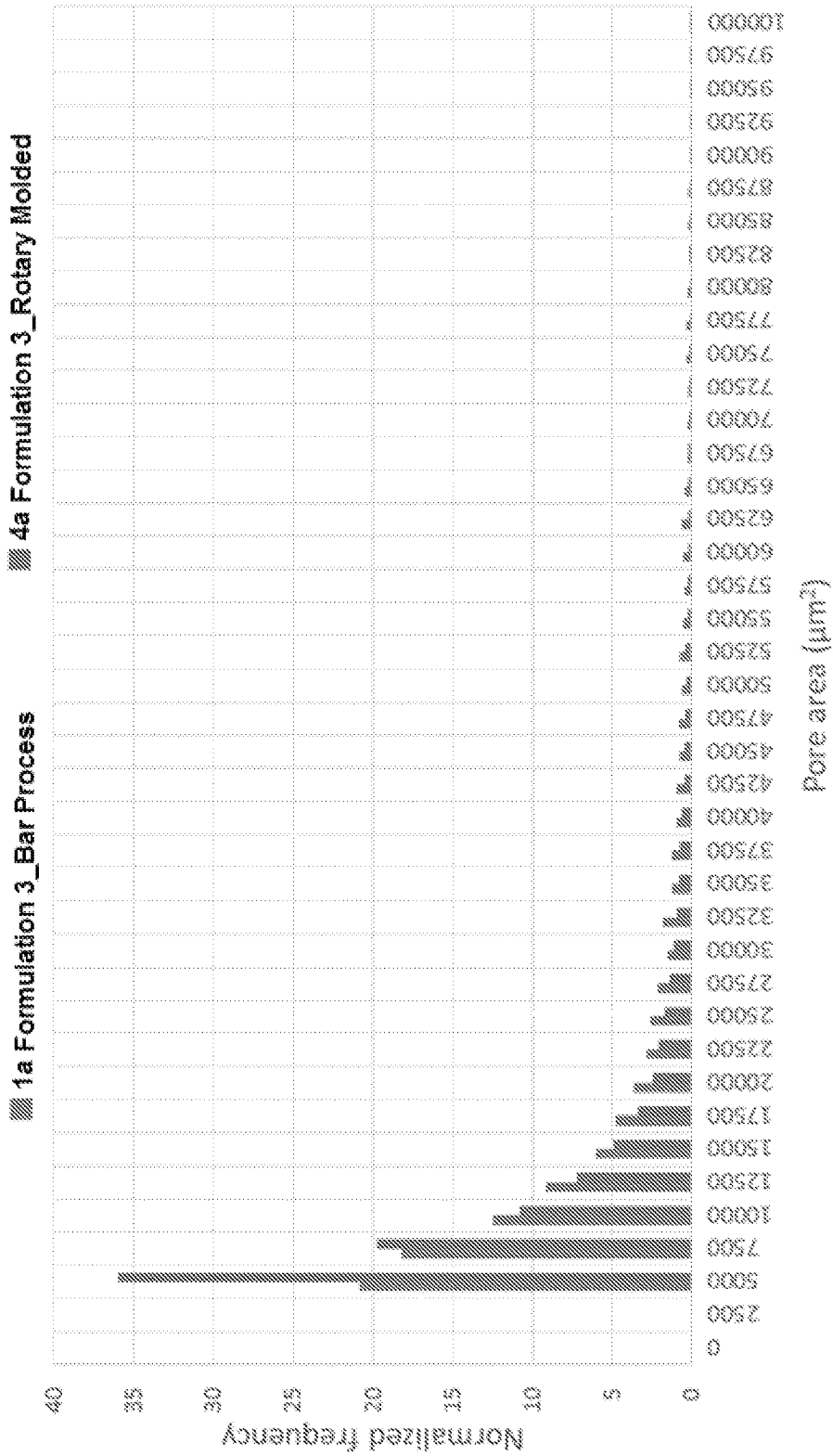
FIG. 11 illustrates a relative frequency histogram plot of the pore size area of an exemplary snack food product shaped using a bar process (illustrated by the bars on the left) and a comparative snack food product shaped by rotary molding (illustrated by the bars on the right).

The pore area was compared between the two samples, and plotted as a relative frequency histogram illustrated in FIG. 11. As shown in FIG. 11, sample 4a (a rotary molded sample, illustrated by the bars on the right) has a higher proportion of smaller pores, while sample 1a (a bar process sample, illustrated by the bars on the left) relatively contains more pores that have a larger size.

Results of X-Ray Tomography Analysis

Figure 12:
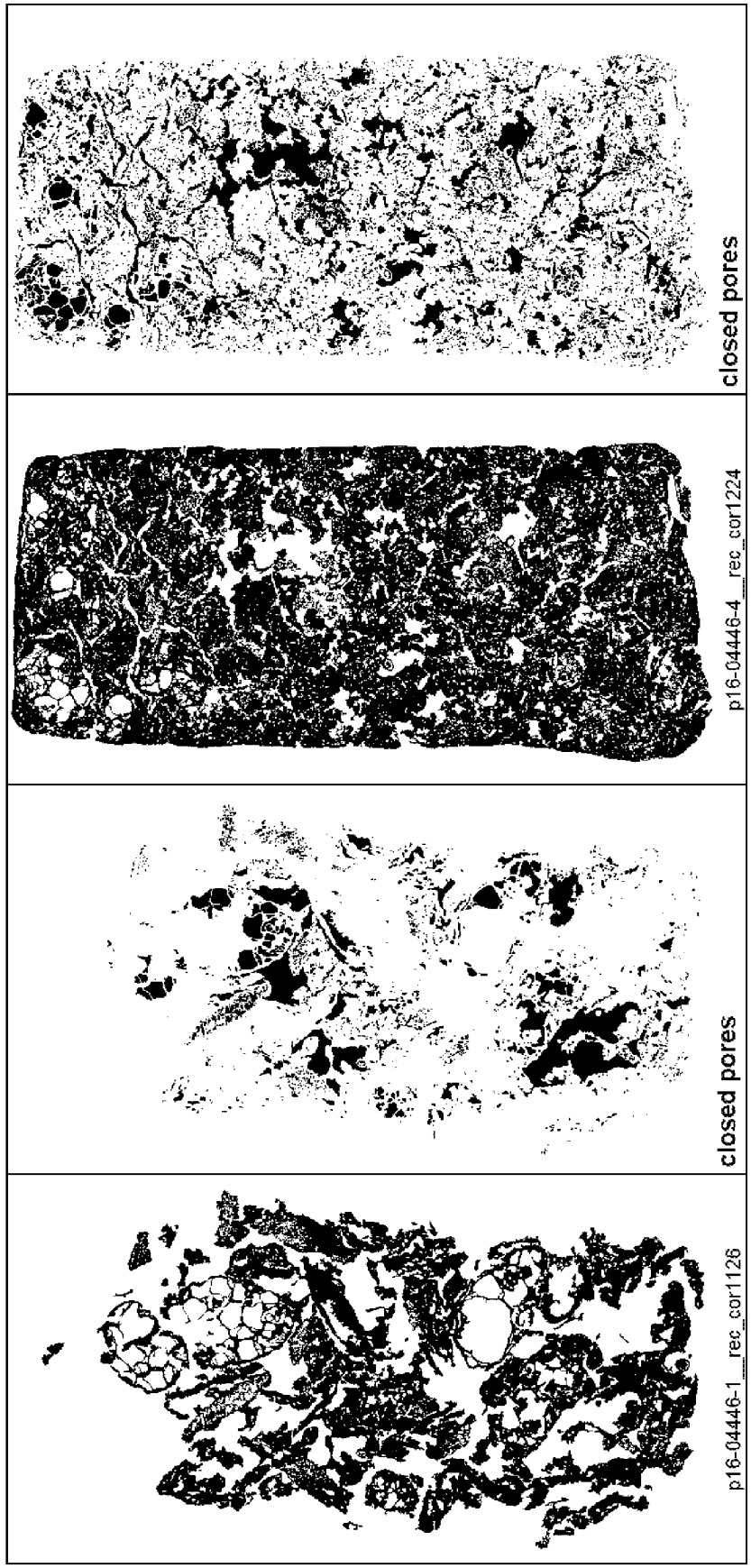
FIG. 12 illustrates the structure and closed porosity of an exemplary snack food product shaped using a bar process and a comparative snack food product shaped by rotary molding.

The open and closed porosity was determined for the two different samples as described in the methods section above. FIG. 12 illustrates the structure and closed porosity for the two samples. The resulting porosity values (total porosity (total %), and closed porosity (closed %), respectively) for both samples (P16-04446-1 Bar Process and P16-04446-4 Rotary Molded) are listed in Table 16.

TABLE 16

Porosity Values

| P16-04446-1 Bar Process | total % | closed % | P16-04446-4 Rotary Molded | total % | closed % |
| --- | --- | --- | --- | --- | --- |
| mean | 43.17653 | 18.45483 | mean | 24.62515 | 22.75726 |
| stdev | 4.006207 | 5.689638 | stdev | 2.593948 | 2.417709 |
| median | 43.39448 | 18.46444 | median | 24.30451 | 22.94671 |
| min | 35.13612 | 7.837053 | min | 18.93579 | 17.21139 |
| max | 56.69986 | 30.06632 | max | 29.27024 | 27.27483 |

Conclusions Regarding X-Ray Tomography Analysis

There is a clear distinction between the two samples when the total porosity is considered, 43% (P16-04446-1 Bar Process) versus 24.6% (P16-04446-4 Rotary Molded). The rotary molded sample had a higher closed porosity and contained a higher proportion of closed pores (22.8%), compared to the standard sample (18.5%).

In summary, the rotary molded sample contains a lower amount of air, and this air consists predominantly of closed pores.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A baked savory food composition that is essentially free of sugar syrups, the food composition comprising:
an inclusion component comprising one or more expanded inclusions;
a shredded component comprising shredded root vegetable, the shredded component included in an amount of at least about 20% by weight of the food composition; and
a binder component comprising no more than about 30% flour by weight of the food composition, no more than about 20% oil by weight of the food composition, and no more than about 20% added sugar by weight of the food composition, the binder component agglomerating the inclusion component and the shredded component,
wherein the food composition has a moisture content of no more than about 4% by weight of the food composition.

2. The food composition of claim 1, comprising no more than about 15% added sugar by weight of the food composition, wherein the food composition has a moisture content of no more than about 3% by weight of the food composition.

3. The food composition of claim 1, wherein the binder component is included in an amount of no more than about 60% by weight of the food composition.

4. The food composition of claim 1, wherein the one or more expanded inclusions are included in an amount of at least about 5% by weight of the food composition.

5. The food composition of claim 1, wherein the one or more expanded inclusions comprise at least one of grains, legumes, seeds, vegetables, fruits, and combinations thereof.

6. The food composition of claim 1, wherein the shredded component further comprises at least about 2% shredded coconut by weight of the food composition.

7. The food composition of claim 1, wherein the shredded component is included in a dehydrated form.

8. The food composition of claim 1, wherein the food composition has a density of no more than about 0.80 g/cc.

9. The food composition of claim 1, wherein at least a portion of the shreds and at least a portion of the one or more expanded inclusion maintain integrity and are visible in the food composition.

10. The food composition of claim 1, wherein the food composition has a Brabender particle size distribution of about 5% or less by weight on a 4 mm (5 mesh) U.S. Standard Sieve, about 30% or less by weight on a 2.36 mm (8 mesh) U.S. Standard Sieve, at least about 25% by weight on a 1.4 mm (12 mesh) U.S. Standard Sieve, at least about 20% by weight on a 0.85 mm (20 mesh) U.S. Standard Sieve, and about 25% or less by weight through a 0.85 mm (20 mesh) U.S. Standard Sieve.

11. The food composition of claim 1, comprising a total porosity of at least about 30% by area of the food composition and a closed porosity of about 25% or less by area of the food composition.

12. A multi-textural baked savory food composition that is essentially free of sugar syrups, the food composition comprising:

about 5% to about 15% expanded inclusions by weight of the food composition;
about 15% to about 30% shredded root vegetable by weight of the food composition;
about 2% to about 15% shredded coconut by weight of the food composition;
no more than about 30% flour by weight of the food composition;
no more than about 20% oil by weight of the food composition; and
no more than about 20% added sugar by weight of the food composition,
wherein the food composition has a moisture content of no more than about 3% by weight of the food composition.

13. The composition of claim 1, wherein the flour is included in an amount of about 15% to about 25% by weight of the food composition.

\* \* \* \* \*